US010703258B2

(12) United States Patent
Nishinakama et al.

(10) Patent No.: US 10,703,258 B2
(45) Date of Patent: Jul. 7, 2020

(54) TRANSMISSION MECHANISM, LEVER MECHANISM, AND CONTACTLESS LEVER SWITCH

(71) Applicant: Panasonic Intellectual Property Management Co., Ltd., Osaka (JP)

(72) Inventors: Hideki Nishinakama, Fukui (JP); Hideki Tsukaoka, Fukui (JP); Masashi Ikeura, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 193 days.

(21) Appl. No.: 15/774,315

(22) PCT Filed: Nov. 21, 2016

(86) PCT No.: PCT/JP2016/004931
§ 371 (c)(1),
(2) Date: May 8, 2018

(87) PCT Pub. No.: WO2017/094236
PCT Pub. Date: Jun. 8, 2017

(65) Prior Publication Data
US 2019/0111830 A1 Apr. 18, 2019

(30) Foreign Application Priority Data

Dec. 2, 2015 (JP) ................................ 2015-236097

(51) Int. Cl.
*H01H 36/00* (2006.01)
*B60Q 1/14* (2006.01)
*G05G 9/02* (2006.01)

(52) U.S. Cl.
CPC ......... *B60Q 1/1476* (2013.01); *B60Q 1/1469* (2013.01); *H01H 36/0006* (2013.01); *H01H 36/0013* (2013.01); *G05G 9/02* (2013.01)

(58) Field of Classification Search
CPC ...... B60Q 1/1476; B60Q 1/1469; G05G 9/02; H01H 36/0006; H01H 36/00; H01H 36/0013
See application file for complete search history.

(56) References Cited

U.S. PATENT DOCUMENTS 3,076,877 A * 2/1963 Arcy .................. H01H 36/0006
                                                            335/55
3,268,684 A * 8/1966 Keller ................. H01H 51/281
                                                           335/154
(Continued)

FOREIGN PATENT DOCUMENTS

JP       2009-140659      6/2009
JP       2010-105621      5/2010

OTHER PUBLICATIONS

International Search Report of PCT application No. PCT/JP2016/004931 dated Feb. 28, 2017.

*Primary Examiner* — Felix O Figueroa
(74) *Attorney, Agent, or Firm* — Greenblum & Bernstein, P.L.C.

(57) ABSTRACT

The first transmission mechanism of the present invention includes a first permanent magnet, a first rocking member with a rod-like shape that includes one end at which the first permanent magnet is disposed and is extended in Z-axis direction, and two supporting bodies that rockably support the first rocking member at two different positions in Z-axis direction of the first rocking member. The first rocking member is rocked to move the first permanent magnet by an amount of displacement smaller than an amount of displacement inputted to the first supporting body, which is located (Continued)

on a side of the other end of the first rocking member in the two supporting bodies.

11 Claims, 18 Drawing Sheets

(56) References Cited

U.S. PATENT DOCUMENTS

| | | | | |
|---|---|---|---|---|
| 3,678,425 | A | * | 7/1972 | Holmes, Jr. ........ H01H 36/0006 335/207 |
| 3,760,312 | A | * | 9/1973 | Shlesinger, Jr. ... H01H 36/0006 335/205 |
| 9,664,536 | B2 | * | 5/2017 | Carpenter .......... H01H 36/0006 |

* cited by examiner

TRANSMISSION MECHANISM, LEVER MECHANISM, AND CONTACTLESS LEVER SWITCH

This application is a U.S. national stage application of the PCT International Application No. PCT/JP2016/004931 filed on Nov. 21, 2016, which claims the benefit of foreign priority of Japanese patent application No. 2015-236097 filed on Dec. 2, 2015, the contents all of which are incorporated herein by reference.

TECHNICAL FIELD

The present invention relates to a transmission mechanism, a lever mechanism, and a contactless lever switch.

BACKGROUND ART

In a driver's seat of a car, a light switch for switching operations such turning on and off of blinkers and turning on and off of a headlight, and a wiper switch for switching operations such as turning on and off of a wiper are mounted on a steering column around a shaft of a steering wheel. The light switch and the wiper switch each are composed of a lever switch having a lever, and the lever can be operated by a driver to switch the light switch or the wiper switch.

Conventionally, for such a lever switch, a stalk switch device (contactless lever switch) has been disclosed, in which a permanent magnet is moved by a lever and the switch is switched according to a position of the permanent magnet detected by a gigantic magneto-resistive sensor to prevent wear of contact points of the switch (see Patent Literature 1).

CITATION LIST

Patent Literature

PTL 1: Unexamined Japanese Patent Publication No. 2009-140659

SUMMARY OF THE INVENTION

A transmission mechanism in accordance with one aspect of the present invention has an object to be moved, a first rocking member with a rod shape that includes one end at which the object to be moved is disposed, the first rocking member extending in a first direction. A first supporting body and a second supporting body that rockably support the first rocking member at two different positions in the first direction of the first rocking member. The first rocking member is rocked to move the object to be moved by an amount of displacement smaller than an amount of displacement inputted to the first supporting body which is located on a side of the other end of the first rocking member in the first supporting body and the second supporting body.

According to the above-mentioned aspect, the manufacturing cost can be reduced.

DESCRIPTION OF EMBODIMENTS

Figure 1:
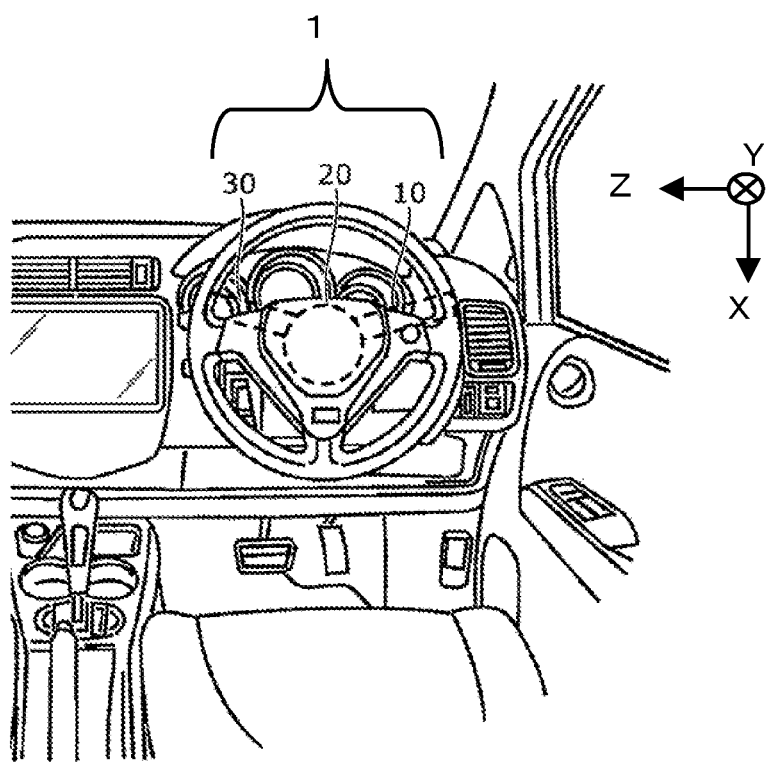
FIG. 1 is a view showing an installation example of a contactless lever switch in accordance with a first exemplary embodiment.

In advance of describing embodiments in the present invention, problems of the conventional device will be described briefly. The art disclosed in Patent Literature 1 is likely to increase the manufacturing cost disadvantageously.
(Findings Used as a Foundation of the Present Invention)

The inventor has found that the stalk switch device (contactless lever switch) described in "BACKGROUND ART" causes the following problems.

In an operation space (place), such as a driver's seat of a car, in which a person operates devices, to make it easy for the person to perform the above-mentioned operation, an operation mechanism for receiving the operation is provided. For instance, in the case of a driver's seat of a car, a contactless lever switch is provided in front of a steering wheel to extend in a horizontal direction. The contactless lever switch is designed such that the operation of each device, such as a blinker, a headlight, or a wiper, is switched when the lever is moved by a predetermined amount of operation (moving distance) in a front-to-back direction or in a vertical direction. Furthermore, a lever handle is provided near the steering wheel such that the driver can operate the contactless lever switch while operating the steering wheel. In other words, to improve driver's operability of the contactless lever switch, the lever handle is provided at a position within a predetermined range near the steering wheel.

In this way, in the contactless lever switch whose lever handle is provided at a position within the predetermined range, to satisfy the predetermined amount of operation, it is necessary that, specifically, a length of the lever of the contactless lever switch (a length from the lever handle to a rocking (pivoting) axis of the lever) and an operation angle of the lever are determined within a suitable range. Accordingly, it is necessary that a position of the rocking axis of the lever is also set within the predetermined range.

Further, a gigantic magneto-resistive sensor that is moved by the lever to detect a position of the permanent magnet should be disposed near the permanent magnet, if movement of the permanent magnet is detected within a detection area of the gigantic magneto-resistive sensor with sufficient accuracy. However, if the gigantic magneto-resistive sensor is provided near the permanent magnet, a circuit board equipped with the gigantic magneto-resistive sensor will need to be disposed close to a lever side. This requires wiring from the inside of a steering column to the circuit board disposed close to the lever side, thereby making it complicated to install the contactless lever switch. Accordingly, the manufacturing cost of the contactless lever switch is increased disadvantageously.

Further, it may be considered that a length from the rocking axis of the lever to the permanent magnet, which is provided at an end on an opposite side of the lever from the lever handle, is extending to bring the permanent magnet close to the circuit board. However, the position of the rocking axis of the lever has been set within the predetermined range as mentioned above. Therefore, the moving distance of the permanent magnet is also increased. As a result, if a moving range of the permanent magnet is kept within the detection area of the gigantic magneto-resistive sensor, a larger gigantic magneto-resistive sensor will be needed, or the greater number of gigantic magneto-resistive sensors will be needed. This increases the manufacturing cost disadvantageously.

Such a problem may occur, as well as in the lever switch, in all of switches that operate an operation unit other than a lever to change a position of an object to be moved, detect the changed position of the object to be moved through a detecting unit, and switch operation of devices according to the detection result. In other words, it is considered that the above-mentioned problem may also occur in a transmission mechanism that receives a predetermined input due to displacement to move an object to be moved.

Therefore, to improve a function of the transmission mechanism, the inventor has examined the following improvement plans.

The transmission mechanism in accordance with one aspect of the present invention has an object to be moved, a first rocking member with a cylindrical shape having one end at which the object to be moved is provided and extending in a first direction, and a first supporting body and a second supporting body that rockably support the first rocking member at two different positions in the first direction of the first rocking member. The first rocking member is rocked to move the object to be moved by an amount of displacement smaller than an amount of the displacement inputted to the first supporting body, which is located on a side of the other end of the first rocking member in the first supporting body and the second supporting body.

According to this, the object to be moved can be moved by an amount of displacement smaller than an amount of displacement, due to displacement by rocking, inputted to the first supporting body. Thus, for instance, even if the position of the rocking axis of the lever has been set within the predetermined range, a moving distance of the object to be moved can be reduced after the object to be moved is brought close to the detecting unit. As a result, the moving distance of the object to be moved can appropriately be adjusted into the detection area of the detecting unit for detecting the object to be moved. Therefore, the object to be moved can be detected with sufficient accuracy without, for example, employing a detecting unit with a huge detection area, or employing a plurality of detecting units. Thus, the manufacturing cost can be reduced.

Further, the first supporting body receives the input due to displacement and moves in the direction intersecting with the first direction. The second supporting body, which is disposed closer to the one end of the first rocking member than the first supporting body is in the first supporting body and the second supporting body, serves as a rocking fulcrum of the first rocking member, when the first supporting body moves. A first distance between the one end of the first rocking member and the second supporting body may be shorter than a second distance between the first supporting body and the second supporting body.

This makes it possible to achieve a structure for moving the object to be moved by an amount of displacement smaller than the amount of displacement to be inputted with a simple structure.

Further, the second supporting body may rockably support the first rocking member by at least two axes, i.e., a first axis and a second axis whose directions are different from each other.

Thus, even if the first rocking member receives inputs due to movements in different directions, the object to be moved can be moved in a corresponding one of the different directions, thereby being available for, for example, a detecting unit to switch operations of different devices.

Further, the first supporting body may receive a first input due to movement along the second direction intersecting with the first direction, and a second input due to movement along a third direction intersecting with the first direction and the second direction. In the second supporting body, the first rocking member may be rocked, by the first input, about the first axis, which is one of the first axis and the second axis, as a fulcrum to move the object to be moved along the second direction different from the first direction. Besides, in the first supporting body, the first rocking member may be rocked, by receiving the second input different from the first input, about the second axis, which is different from the first axis, as a fulcrum to move the object to be moved in the third direction different from the first direction and the second direction.

Further, one of the first supporting body and the second supporting body receives a third input due to the movement along the first direction, and the first rocking member is moved, by the third input, along the first direction and slid with respect to the other of the first supporting body and the second supporting body. By using the movement, the object to be moved may be moved along the first direction.

Accordingly, a structure for moving the object to be moved in three different directions can easily be achieved, thereby being available for, for example, a detecting unit to switch operations of three different devices by using a single transmission mechanism. This makes it possible to simplify the structure for switching operation of three devices.

Further, the first rocking member is spherically supported by the second supporting body. The second supporting body receives the third input and moves in the first direction to move the first rocking member along the first direction. The first supporting body and the first rocking member may be connected to be sildable and rockable in the first direction.

This makes it possible to move the object to be moved along a predetermined arc. Therefore, a coordinate value can be calculated with relative ease when the object to be moved is detected by a first magnetic sensor. Further, by moving two members, i.e., the first supporting body and the second supporting body, the motion of the object to be moved is achieved. This makes it possible to relatively reduce stacked tolerance, which affects the moving distance of the object to be moved.

Further, the first rocking member is spherically supported by the first supporting body. The first supporting body receives the third input and moves in the first direction to move the first rocking member along the first direction. The second supporting body and the first rocking member may be connected to be sildable and rockable in the first direction.

Accordingly, the object to be moved can be moved along the three different directions from the first supporting body serving as one member. This makes it possible to reduce stacked tolerance, which affects the moving distance of the object to be moved.

Still furthermore, the transmission mechanism has a third supporting body that spherically supports the one end of the first rocking member and supports the object to be moved at a position corresponding to the one end of the first rocking member, and a guide member that performs at least one of a movement for moving the third supporting body along a plane intersecting with the first direction or a movement for moving the first rocking member in the first direction by receiving the third input due to the movement along the first direction and moving in the first direction. Each of the first supporting body and the second supporting body and the first rocking member are connected to be slidable in the first direction. The first rocking member is moved, by the third input, along the first direction and slid with respect to the first supporting body and the second supporting body. By using the movement, the object to be moved may be moved along the first direction.

This makes it possible to move the object to be moved on a plane intersecting with the first direction. Accordingly, when the object to be moved is detected by the first magnetic sensor, a coordinate value can easily be calculated.

Further, the lever mechanism in accordance with one aspect of the present invention has a first transmission mechanism serving as the above-mentioned transmission mechanism, and a lever that is supported to be rockable according to movement of a handle portion and gives displacement to the first supporting body.

Accordingly, the object to be moved can easily be moved by rocking the lever.

Further, the lever mechanism in accordance with one aspect of the present invention has a first transmission mechanism serving as the above-mentioned transmission mechanism, and a lever that is supported to be rockable in two axes whose directions are different from each other, i.e., a third axis and a fourth axis and gives displacement to the first supporting body. The lever is rocked about the third axis, which is one of the third axis and the fourth axis, as a fulcrum to apply the first input to the first transmission mechanism, and is rocked about the fourth axis as a fulcrum to apply the second input to the first transmission mechanism.

Accordingly, the object to be moved can easily be moved in two different directions by rocking the lever.

Further, the lever has a first lever member that is rockably supported, and a second lever member whose at least one portion is disposed inside or outside the first lever member. The second lever member is also provided to be rotatable about an axis parallel to an extending direction of the lever as a rotational axis with respect to the first lever member, and extends in the extending direction of the lever. The lever mechanism may further have a second rocking member that receives rotation of the second lever member and rocks to apply the third input due to the movement along the first direction to the first rocking member.

Accordingly, the object to be moved can easily be moved in three different directions by rocking or rotating the lever.

Further, the contactless lever switch in accordance with one aspect of the present invention has a first case that accommodates the first magnetic sensor, and a second case that accommodates the above-mentioned lever mechanism, a portion at which the lever is supported, and the first transmission mechanism, and is connected to a predetermined position located outside the first case. The object to be moved included in the first transmission mechanism is the first permanent magnet. A direction and a position of the first magnetic sensor are determined such that a first detection area of the first magnetic sensor is arranged on a predetermined position side of the first case. In the state where the first case and second case are connected to each other, the first transmission mechanism moves the first permanent magnet within the first detection area by using rocking from the lever.

Accordingly, the connection of the first case and the second case makes it suitable to move the permanent magnet into a detection area in which the magnetic sensor can detect. This eliminates necessity for wiring between the first case and the second case, so that the manufacturing cost can be reduced.

Further, the contactless lever switch in accordance with one aspect of the present invention may further have a controller that, based on a detection result of the first magnetic sensor, specifies a three dimensional position of the first permanent magnet in the first detection area and switches operation of devices according to the specified three dimensional position.

Further, the contactless lever switch in accordance with one aspect of the present invention may further have a second magnetic sensor different from the first magnetic sensor, a second permanent magnet different from the first permanent magnet, and a second transmission mechanism, which is different from the first transmission mechanism, in which the second permanent magnet is disposed at an end on an opposite side thereof from the lever. The lever may further have a third lever member disposed inside or outside the first lever member. The third lever member is also provided to be rotatable about the axis parallel to the extending direction of the lever as a rotational axis with respect to the first lever member and the second lever member, and extends in the extending direction of the lever. The third lever member rotates about the axis parallel to the extending direction of the lever with respect to the first lever member. The first case further accommodates the second magnetic sensor of which a direction and a position are determined such a second detection area of the second magnetic sensor is arranged on a predetermined position side of the first case. The second case may further accommodate the second permanent magnet and the second transmission mechanism. In the state where the first case and second case are connected to each other, the second transmission mechanism may receive rotation of the third lever member to move the second permanent magnet within the second detection area.

Further, the contactless lever switch in accordance with one aspect of the present invention may further have a controller that specifies a three dimensional position of the first permanent magnet in the first detection area based on a detection result of the first magnetic sensor and specifies a three dimensional position of the second permanent magnet in the second detection area based on a detection result of the second magnetic sensor, and then switches operation of devices according to the specified three dimensional position of each of the first permanent magnet and the second permanent magnet.

Hereinafter, the transmission mechanism, the lever mechanism, and the contactless lever switch in accordance with one aspect of the present invention will be described specifically, with reference to the drawings.

Note that, each exemplary embodiment described in the following shows a concrete example of the present invention. The numerical values, shapes, materials, structural elements, arrangement and connection of the structural elements, and the like shown in the following embodiment are mere examples, and thus are not intended to limit the present invention. Further, among the structural elements in the following embodiment, structural elements not recited in any one of the independent claims representing the most generic concepts of the present invention are described as arbitrary structural elements.

First Exemplary Embodiment

Hereinafter, a first exemplary embodiment will be described with reference to FIGS. 1 to 9C.

[Structure]

Figure 2:
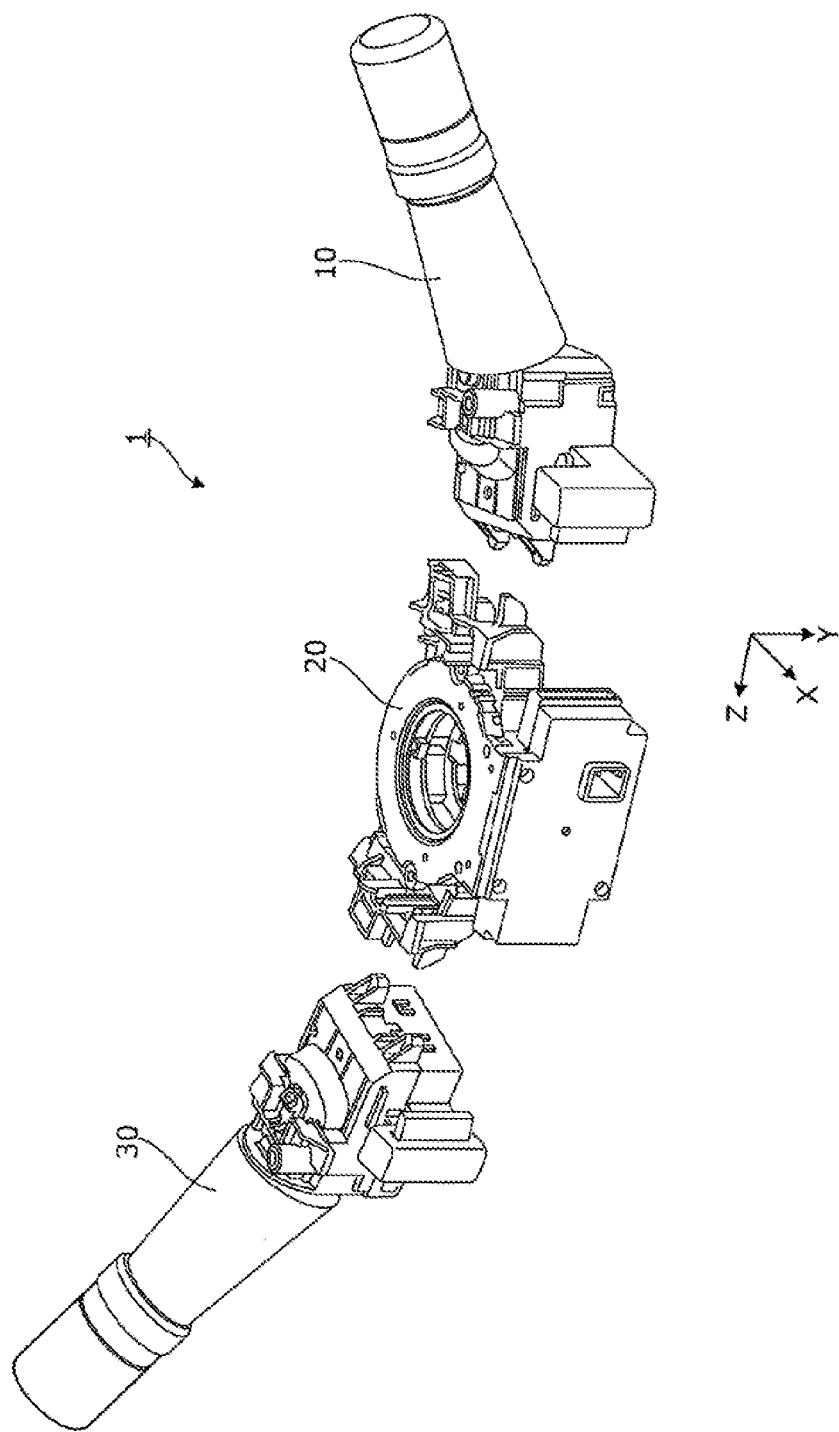
FIG. 2 is a view showing a relationship between a lever mechanism and a steering column in accordance with the first exemplary embodiment.

FIG. 1 is a view showing an installation example of a contactless lever switch in accordance with the first exemplary embodiment. FIG. 2 is an exploded view of the contactless lever switch and a control device in accordance with the first exemplary embodiment.

As shown in FIG. 1, contactless lever switch 1 is provided in, for example, a driver's seat of a car, and has lever mechanisms 10 and 30, and control device 20. Lever mechanisms 10 and 30 are disposed such that levers of lever mechanisms 10 and 30 are extended from control device 20 along left and right directions (Z-axis direction) of the page, respectively.

Lever mechanism 10 is connected to a right side surface of control device 20. Lever mechanism 10 functions as a light switch together with a magnetic sensor which is a detecting unit included in control device 20. The light switch is equipped for switching operations such as turning on and off of blinkers and turning on and off of a headlight.

Lever mechanism 30 functions as a wiper switch together with another magnetic sensor which is a detecting unit included in control device 20. The wiper switch is equipped for switching operations such as turning on and off of a wiper.

Control device 20 is a steering column that functions as a revolving shaft of a steering wheel, and has a circuit board on which magnetic sensors described later are disposed.

Note that, in the present exemplary embodiment, a direction in which the revolving shaft of the steering wheel is extended is defined as Y-axial direction, and a direction substantially orthogonal to Y-axial direction and Z-axial direction is defined as X-axial direction. X-axial direction, Y-axial direction, and Z-axial direction are substantially orthogonal to one another. Further, hereinafter, a side to which arrow heads of X-axial direction, Y-axial direction, and Z-axial direction are directed is referred to as a positive side, and an opposite side thereof is referred to as a negative side.

Furthermore, as shown in FIG. 2, lever mechanisms 10 and 30 are fixed to predetermined positions at both ends in Z-axial direction of control device 20. Lever mechanisms 10 and 30 are disposed such that the levers of lever mechanisms 10 and 30 are inclined from Z-axial direction to the negative side in Y-axial direction. No electric wirings are provided between lever mechanism 10 and control device 20 and between lever mechanism 30 and control device 20.

Next, a functional configuration of the contactless lever switch will be described.

Figure 3:
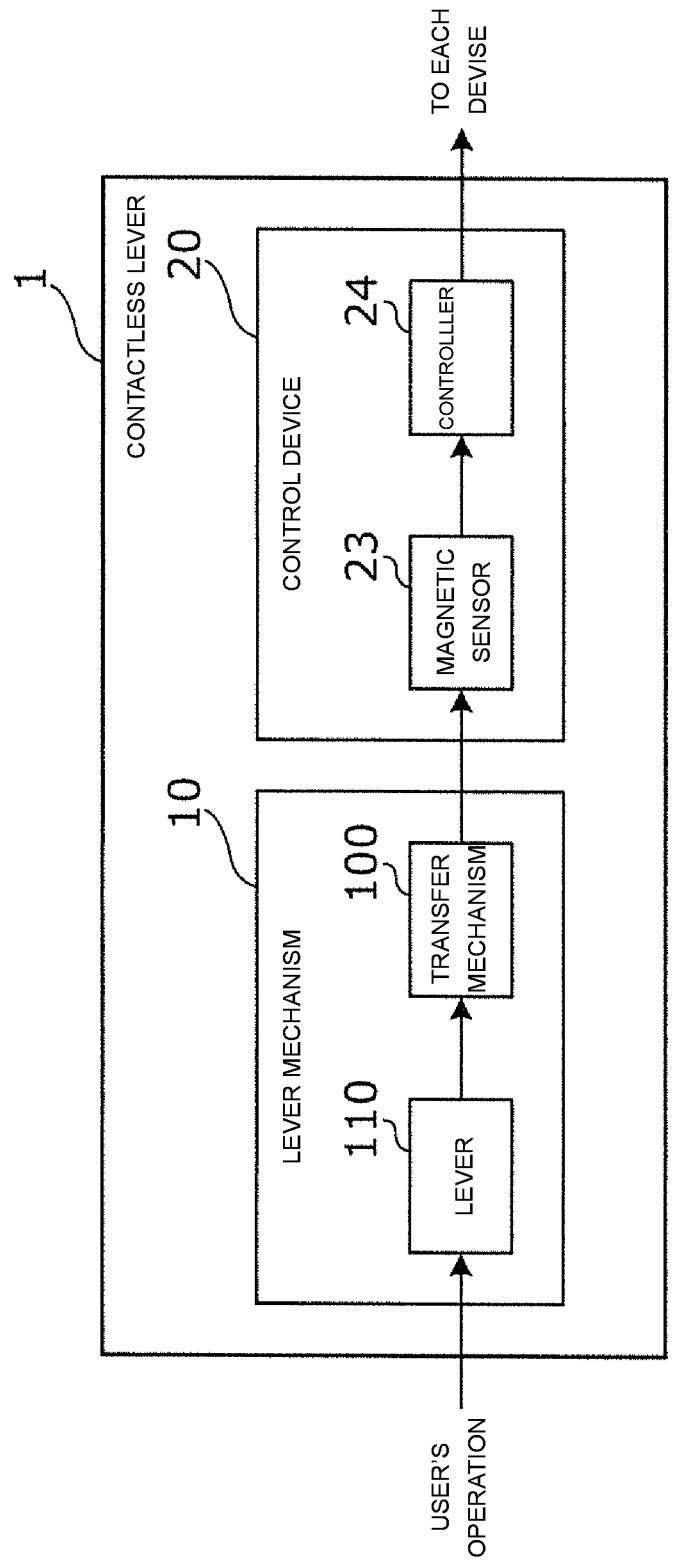
FIG. 3 is a block diagram showing a functional configuration of the contactless lever switch.
Figure 4:
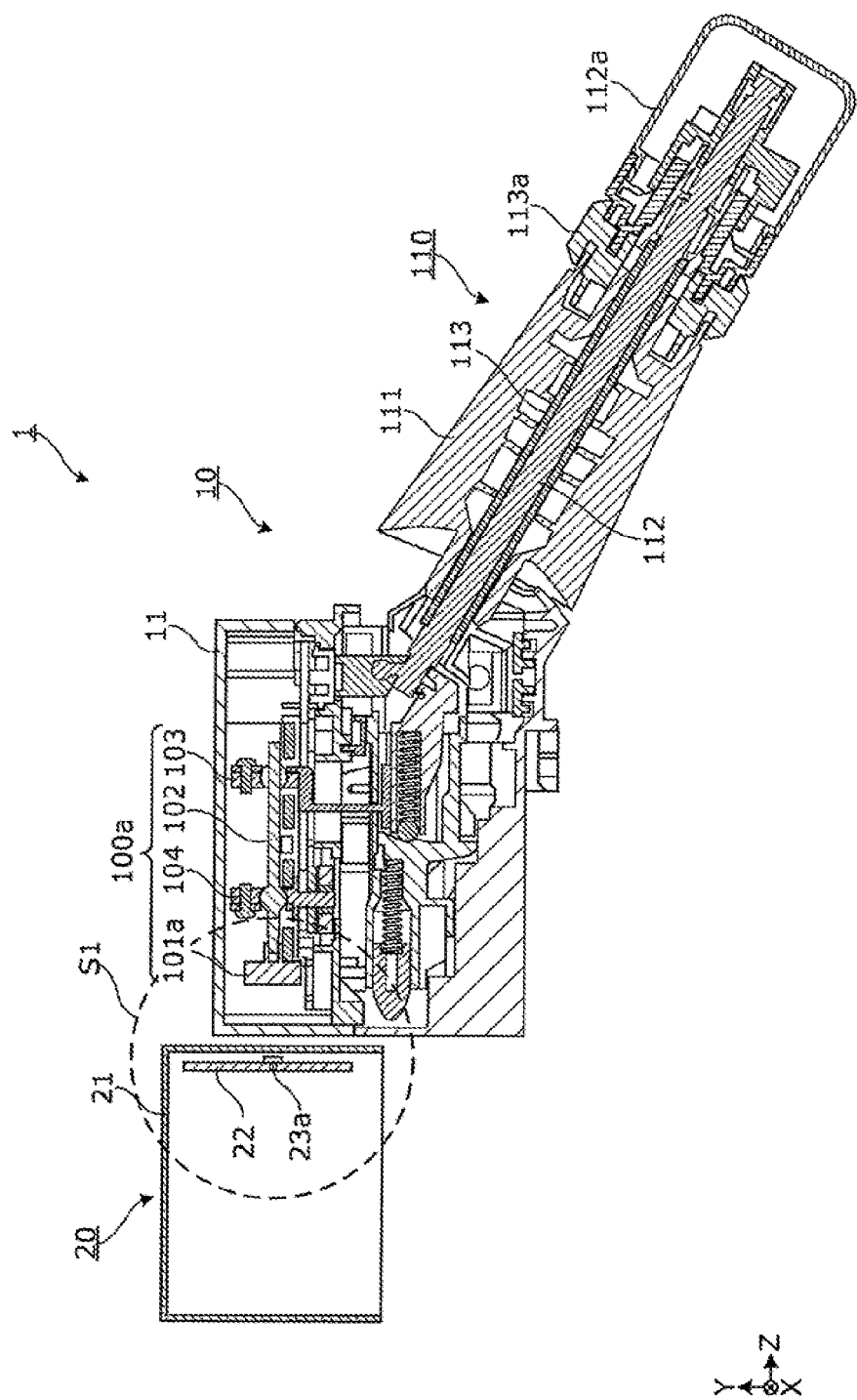
FIG. 4 is a cross-sectional view of the lever mechanism and the steering column taken along Y-Z plane.
Figure 5:
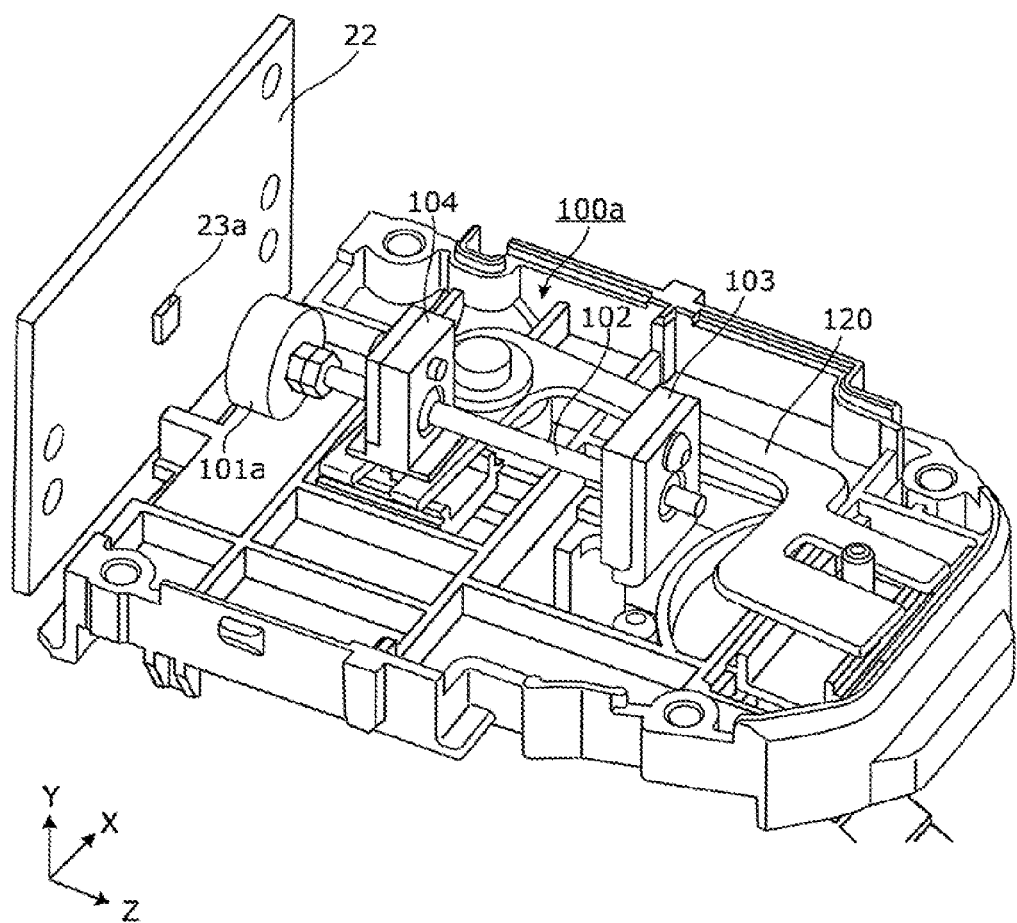
FIG. 5 is a view for explaining a relationship between a circuit board and a transmission mechanism.
Figure 6:
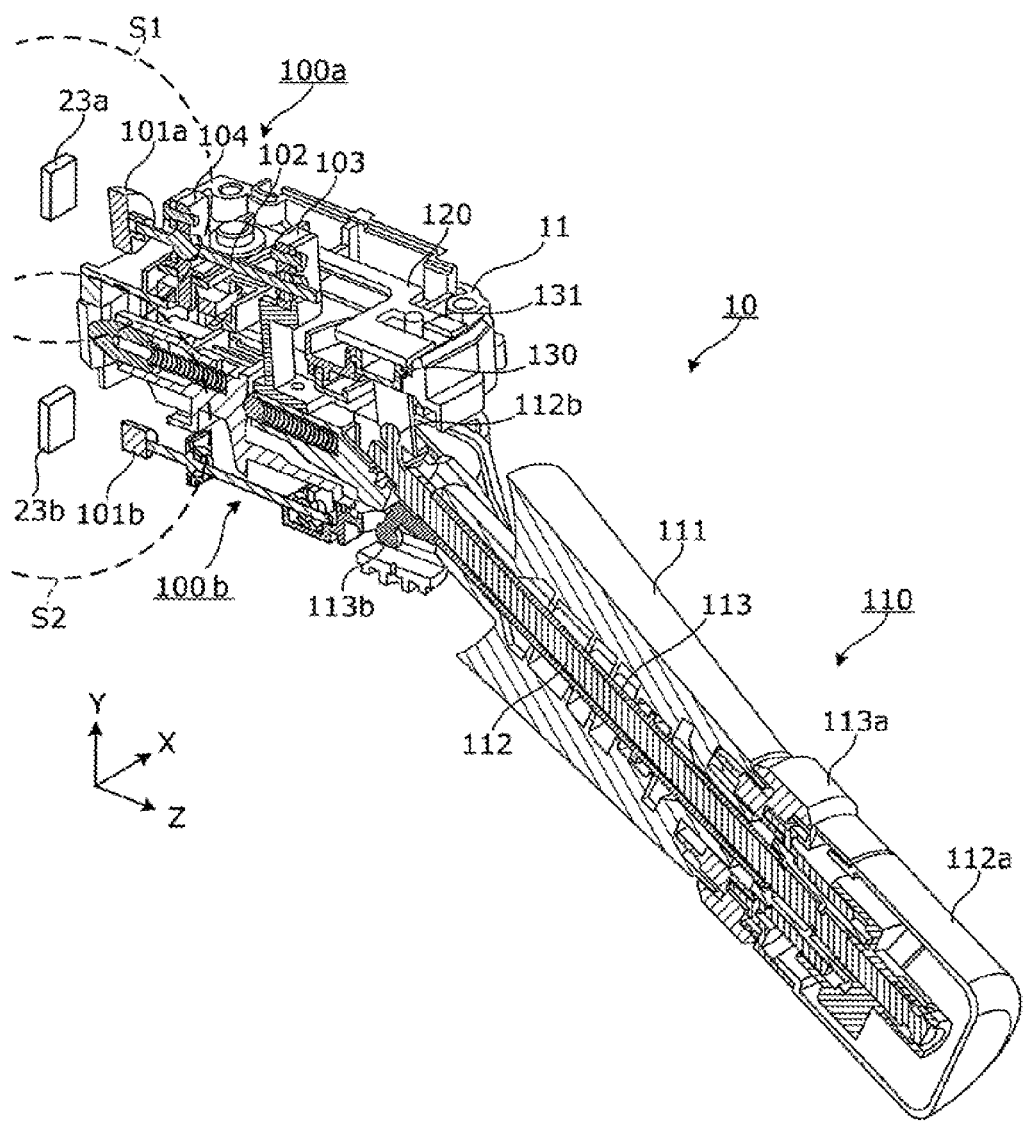
FIG. 6 is a perspective view of the contactless lever switch taken along Y-Z plane.

FIG. 3 is a block diagram showing the functional configuration of the contactless lever switch. FIG. 4 is a cross-sectional view when the lever mechanism and the control device are taken along Y-Z plane. FIG. 5 is a view for explaining a relationship between a circuit board and a transmission mechanism. FIG. 6 is a perspective view of the contactless lever switch taken along Y-Z plane.

As shown in FIG. 3, contactless lever switch 1 has lever mechanism 10 and control device 20. Lever mechanism 10 has lever 110 for receiving a user's operation, and transmission mechanism 100 for moving an object to be moved by an amount of displacement smaller than an amount of displacement of the lever, which depends on the user's operation that is received through lever 110. For instance, as shown in FIGS. 4 to 6, transmission mechanism 100 is composed of first transmission mechanism 100a and second transmission mechanism 100b. First transmission mechanism 100a has first permanent magnet 101a as the object to be moved, and second transmission mechanism 100b has second permanent magnet 101b as the object to be moved. Note that, a detailed configuration of lever mechanism 10 will be described later.

Further, control device 20 has magnetic sensor 23 and controller 24.

Magnetic sensor 23 is composed of first magnetic sensor 23a and second magnetic sensor 23b. First magnetic sensor 23a detects a position of first permanent magnet 101a moved by first transmission mechanism 100a, as shown in FIGS. 4 to 6. The second magnetic sensor 23b detects a position of second permanent magnet 101b moved by second transmission mechanism 100b. First magnetic sensor 23a and second magnetic sensor 23b are sensors composed of, for example, a Hall-effect element. Note that, first magnetic sensor 23a and second magnetic sensor 23b are not limited to a Hall-effect element, but may be a sensor composed of a magneto-resistive element. First magnetic sensor 23a detects a change in magnetic field of first detection area S1 (see FIG. 4), and outputs the detected result. Second magnetic sensor 23b detects a change in magnetic field of second detection area S2 (see FIG. 6), and outputs the detected result. Note that, first magnetic sensor 23a and second magnetic sensor 23b may be disposed on a sheet of circuit board 22 (see FIG. 5), or may be disposed on separate circuit boards.

Based on the results detected by first magnetic sensor 23a and second magnetic sensor 23b, controller 24 specifies a three dimensional position of first permanent magnet 101*a* in first detection area S1 of first magnetic sensor 23*a*, and specifies a three dimensional position of second permanent magnet 101*b* in second detection area S2 of second magnetic sensor 23*b*. Depending on each of the specified three-dimensional positions of first permanent magnet 101*a* and second permanent magnet 101*b*, controller 24 switches operation of each device such as blinkers or a headlight. Controller 24 is composed of, for example, a processor and a memory that stores programs. For instance, an output (for example, voltage value) of first magnetic sensor 23*a* and the three dimensional position of first magnetic sensor 23*a* in first detection area S1 are correlated with each other in advance. Controller 24 specifies a coordinate value indicating the three-dimensional position of first magnetic sensor 23*a* that corresponds to the detected result. Note that, controller 24 performs the same processing as that of first magnetic sensor 23*a* to specify a coordinate value indicating the three-dimensional position of second magnetic sensor 23*b*.

As shown in FIGS. 4 and 5, lever mechanism 10 has first transmission mechanism 100*a*, second transmission mechanism 100*b*, and lever 110. Further, lever mechanism 10 has second case 11 for accommodating a portion at which lever 110 is supported, and first transmission mechanism 100*a*. Second case 11 is connected to a predetermined position on the outside of first case 21, which serves as a case of control device 20. Note that, the portion at which lever 110 is supported includes, for example, at least a portion between a rocking axis of lever 110 and an opposite end of lever 110 from a handle.

First transmission mechanism 100*a* has first permanent magnet 101*a* serving as the object to be moved, first rocking member 102, and first supporting body 103 and second supporting body 104 for supporting first rocking member 102. When lever 110 is rocked in the state where first case 21 and second case 11 are connected to each other, first transmission mechanism 100*a* causes first permanent magnet 101*a* to move within first detection area S1 of first magnetic sensor 23*a*.

First rocking member 102 is a rod member extending in Z-axial direction (first direction) at an end of First rocking member 102, first permanent magnet 101*a* is disposed For instance, first permanent magnet 101*a* is fixed to an end on the negative side in Z-axial direction of first rocking member 102. First rocking member 102 is, for example, a metal member having predetermined stiffness.

First supporting body 103 and second supporting body 104 supports first rocking member 102 in rocking manner at two different positions in Z-axial direction of first rocking member 102. Among first supporting body 103 and second supporting body 104, first supporting body 103 is disposed on the positive side in Z-axial direction and can be moved according to the displacement inputted by lever 110. Among first supporting body 103 and second supporting body 104, second supporting body 104 is disposed on the negative side in Z-axial direction supports first rocking member 102 as a fulcrum such that first rocking member 102 can rock about the first axis parallel to X-axial direction as a fulcrum (first rocking) and can rock about the second axis parallel to Y-axial direction as a fulcrum (second rocking). In other words, second supporting body 104 supports first rocking member 102 such that first rocking member 102 can rock about at least two axes whose directions are different from each other.

Further, first transmission mechanism 100*a* may further have second rocking member 120. Second rocking member 120 rocks about a fifth axis parallel to Y-axial direction as a fulcrum according to the displacement inputted by lever 110, and applies a third input, which serves as displacement along Z-axial direction, to second supporting body 104.

Lever 110 is supported so as to be rockable about the third axis parallel to X-axial direction as a fulcrum (third rocking) and be rockable about the fourth axis parallel to Y-axial direction as a fulcrum (fourth rocking) according to movement of the handle. In other words, lever 110 is supported so as to be rockable about two axes whose directions are different from each other according to movement of the handle. Further, an opposite end of lever 110 from the handle is fixed to first supporting body 103 in the state where an axis of the third rocking and an axis of the fourth rocking are interposed between the handle and the opposite end. In other words, lever 110 is allowed to apply displacement to first supporting body 103 through the third rocking and the fourth rocking. In this way, lever 110 applies the first input to first supporting body 103 of first transmission mechanism 100*a* through the third rocking, and applies the second input to first supporting body 103 of first transmission mechanism 100*a* through the fourth rocking.

Further, lever 110 has first lever member 111, second lever member 112, and third lever member 113. First lever member 111 is rockably supported with respect to second case 11. Second lever member 112 is disposed inside first lever member 111. Second lever member 112 is provided to be rotatable about an axis parallel to an extending direction (i.e., direction inclined from Z-axial direction to the negative side in Y-axial direction) of lever 110 as a rotational axis with respect to first lever member 111, and extends in the extending direction of lever 110. Further, third lever member 113 is disposed inside first lever member 111 and outside second lever member 112. Third lever member 113 is provided to be rotatable about an axis parallel to the extending direction of lever 110 as a rotational axis with respect to first lever member 111 and second lever member 112, and extends in the extending direction of lever 110.

Specifically, first lever member 111 has a cylindrical space therein. Third lever member 113 is a hollow cylindrical member. The external shape of the third lever member 113 follows the above-mentioned cylindrical space formed inside first lever member 111, and disposed inside the above-mentioned cylindrical space. Furthermore, second lever member 112 is a cylindrical member. The external shape of second lever member 112 follows a cylindrical space formed inside third lever member 113, and disposed inside the above-mentioned cylindrical space formed inside third lever member 113. According to the structure, second lever member 112 can rotate about an axis parallel to the extending direction of lever 110 as a rotating axis with respect to first lever member 111 and third lever member 113, and third lever member 113 can rotate about the axis parallel to the extending direction of lever 110 as a rotational axis with respect to first lever member 111 and second lever member 112.

Further, second lever member 112 has knob 112*a*, and protrusion 112*b* that is disposed at an end on a rocking axis side of lever 110. When a driver rotates knob 112*a*, second lever member 112 is rotated with respect to first lever member 111 and third lever member 113, thereby moving protrusion 112*b* mentioned above. This causes first sliding member 130, which is provided to be slidable in X-axial direction, to move in X-axial direction with respect to second case 11. As first sliding member 130 is moved, projection part 131 provided in the first sliding member is moved, thereby making it possible to rock second rocking member 120.

Further, third lever member 113 has knob 113a, and protrusion 113b that is disposed at an end on the rocking axis side of lever 110. When the driver rotates knob 113a, third lever member 113 rotates with respect to first lever member 111 and second lever member 112, and thus protrusion 113b, mentioned above, is moved. This makes it possible to rock second transmission mechanism 100b. Note that, second transmission mechanism 100b has the same configuration as that of first transmission mechanism 100a. Therefore, the description thereof is omitted.

Control device 20 has first case 21, and circuit board 22 equipped with first magnetic sensor 23a, as shown in FIG. 4. Circuit board 22 is accommodated in first case 21. First magnetic sensor 23a is disposed in a direction and at a position such that first detection area S1 of first magnetic sensor 23a is arranged toward a predetermined position to be connected to second case 11 located outside first case 21. Note that, a processor that functions as controller 24 described in FIG. 3, and a memory may be mounted on circuit board 22. Alternatively, the processor constituting controller 24, and the memory may be disposed outside first case 21.

Second supporting body 104, mentioned above, supports first rocking member 102 as a fulcrum, and first rocking member 102 is configured to be rockable about a first axis parallel to X-axial direction as a fulcrum (first rocking) and be rockable about a second axis parallel to Y-axial direction as a fulcrum (second rocking). Herein, a concrete configuration of first transmission mechanism 100a for achieving the first rocking and the second rocking of first rocking member 102 will be described with reference to FIG. 7.

Figure 7:
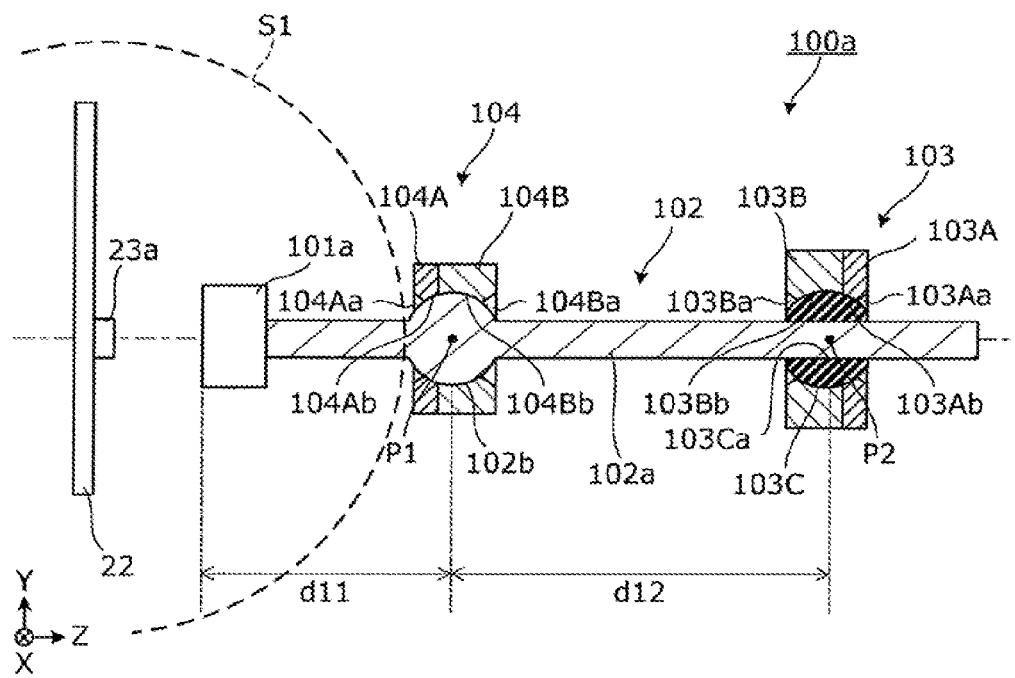
FIG. 7 is a cross-sectional view of the transmission mechanism in Y-Z plane.

FIG. 7 is a cross-sectional view of the transmission mechanism in Y-Z plane.

As shown in FIG. 7, first rocking member 102 has rod portion 102a with a rod shape, and spherical part 102b with a spherical shape whose diameter is larger than a width of rod portion 102a. First rocking member 102 is formed at a position separated from an end on the negative side in Z-axial direction of rod portion 102a by first distance d11. On spherical part 102b, first rocking member 102 is spherically supported by second supporting body 104. Further, first distance d11 between second supporting body 104 and the end (first permanent magnet 101a) on the negative side in Z-axial direction of first rocking member 102 is shorter than second distance d12 between first supporting body 103 and second supporting body 104.

Second supporting body 104 is composed of pressing member 104A disposed on the negative side in Z-axial direction of second supporting body 104, and main support member 104B disposed on the positive side in Z-axial direction of second supporting body 104. Pressing member 104A and main support member 104B have through holes 104Aa and 104Ba through which rod portion 102a passes, and spherical parts 104Ab and 104Bb which are in spherical contact with spherical part 102b, respectively. In other words, a portion on the negative side in Z-axial direction of rod portion 102a from spherical part 102b passes through through hole 104Aa of pressing member 104A, and spherical part 104Bb of pressing member 104A is in contact with the negative side in Z-axial direction of spherical part 102b. Further, a portion on the positive side in Z-axial direction of rod portion 102a from spherical part 102b passes through through hole 104Ba of main support member 104B, and spherical part 104Bb of main support member 104B is in contact with the positive side in Z-axial direction of spherical part 102b.

Note that, each of through holes 104Aa and 104Ba has a substantially conical shape whose diameter is increased as the distance from spherical part 102b is increased, so that rod portion 102a can be rocked about center P1 of spherical part 102b as a fulcrum. Further, main support member 104B has a width in Z-axial direction larger than that of pressing member 104A. Thus, spherical part 104Bb is in contact with not only the positive side in Z-axis direction of spherical part 102b but the negative side in Z-axis direction of spherical part 102b.

Pressing member 104A and main support member 104B are fixed to each other with a fastening member (not shown), such as a screw or a rivet, in the state where rod portion 102a of first rocking member 102 passes through pressing member 104A and main support member 104B, and spherical part 102b is interposed between pressing member 104A and main support member 104B in Z-axial direction. In this way, spherical part 102b of first rocking member 102 is spherically supported by second supporting body 104.

First supporting body 103 is composed of pressing member 103A disposed on the positive side in Z-axial direction, and main support member 103B disposed on the negative side in Z-axial direction. First supporting body 103 further has spherical surface member 103C that is in spherical contact with pressing member 103A and main support member 103B.

Pressing member 103A and main support member 103B have through holes 103Aa and 103Ba through which rod portion 102a passes, and spherical parts 103Ab and 103Bb that are in spherical contact with spherical surface member 103C, respectively. In other words, spherical part 103Ab of pressing member 103A is in contact with the positive side in Z-axial direction of spherical surface member 103C, and spherical part 103Bb of main support member 103B is in contact with the negative side in Z-axial direction of spherical surface member 103C.

Note that, each of through holes 103Aa and 103Ba has a substantially conical shape whose diameter is increased as the distance from spherical surface member 103C is increased, so that rod portion 102a can be rocked about center P2 of spherical surface member 103C as a fulcrum. Further, main support member 103B has a width in Z-axial direction larger than that of pressing member 103A. Thus, spherical part 103Bb is in contact with not only the negative side in Z-axial direction of spherical surface member 103C but the positive side in Z-axial direction of spherical surface member 103C.

Spherical surface member 103C has through hole 103Ca through which rod portion 102a passes. Through hole 103Ca has a shape that follows an external surface of rod portion 102a, and an internal surface of through hole 103Ca is in contact with the external surface of rod portion 102a. Thus, spherical surface member 103C is configured to be slidable with rod portion 102a in through hole 103Ca. In other words, first rocking member 102 is slidably connected with first supporting body 103 in a direction (first direction) in which rod portion 102a of first rocking member 102 extends. Further, rod portion 102a of first rocking member 102 is connected to be rockable about center P2 of spherical surface member 103C as a fulcrum in the state where rod portion 102a passes through through hole 103Ca of spherical surface member 103C.

Further, first rocking member 102 is configured to be movable in Z-axial direction. Now, a concrete configuration of first transmission mechanism 100a in which first rocking member 102 is movable in Z-axial direction will be described with reference to FIG. 8.

Figure 8:
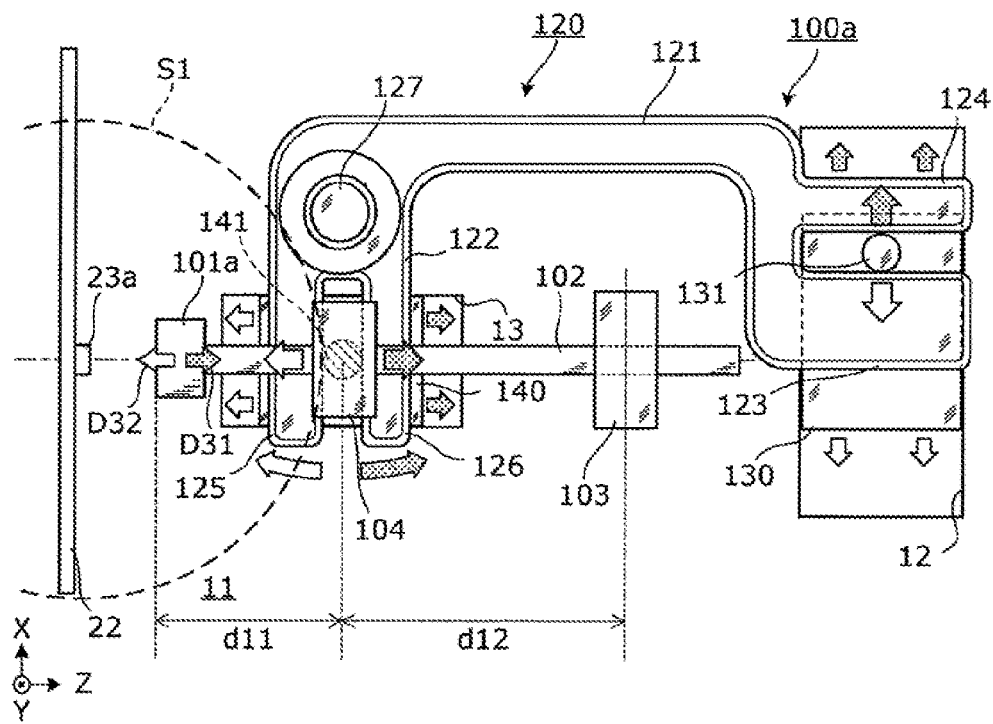
FIG. 8 is a plan view of the transmission mechanism when viewed from above (positive side in Z-axis direction).

FIG. 8 is a plan view of the transmission mechanism when viewed from above (positive side in Y-axial direction).

As shown in FIG. 8, first transmission mechanism 100a has second rocking member 120, first sliding member 130, and second sliding member 140, in addition to first permanent magnet 101a, first rocking member 102, first supporting body 103, and second supporting body 104.

First sliding member 130 is supported to be slidable in X-axial direction with respect to opening 12 that has an elongated rectangular shape in X-axial direction and is formed in second case 11. Further, first sliding member 130 has cylindrical projection part 131 projected toward the positive side in Y-axial direction.

Second sliding member 140 is supported to be slidable in Z-axial direction with respect to opening 13 that has an elongated rectangular shape in Z-axial direction and is formed in second case 11. Further, second sliding member 140 has cylindrical projection part 141 projected toward the positive side in Y-axial direction, and is fixed to second supporting body 104 via projection part 141. In other words, second sliding member 140 can cause second supporting body 104 to move in Z-axial direction with respect to second case 11.

which has a substantially L-shape, is connected to second case 11 by shaft body 127 with a substantially column like shape such that second rocking member 120 is rockable (pivotable) about shaft body 127. Shaft body 127 is disposed on a lateral side and the positive side in X-axial direction of second supporting body 104. Second rocking member 120 has first portion 121 extending from shaft body 127 toward the positive side in Z-axial direction, and second portion 122 extending from shaft body 127 toward second supporting body 104 (i.e., negative side in X-axial direction).

First portion 121 is divided into two parts in X-axial direction. In other words, a slit extending in Z-axial direction is formed in first portion 121. Specifically, first portion 121 has third portion 123 disposed on the negative side in X-axial direction of projection part 131 of first sliding member 130, and fourth portion 124 disposed on the positive side in X-axial direction of projection part 131. In other words, first portion 121 has two portions extending from shaft body 127 toward the positive side in Z-axial direction, i.e., third portion 123 and fourth portion 124. Projection part 131 is interposed between third portion 123 and fourth portion 124.

Second portion 122 is divided into two parts in Z-axial direction. In other words, a slit extending in X-axial direction is formed in second portion 122. Specifically, second portion 122 has fifth portion 125 disposed on the negative side in Z-axial direction of projection part 141 of second sliding member 140 fixed to second supporting body 104, and sixth portion 126 disposed on the positive side in Z-axial direction of projection part 141. In other words, second portion 122 has two portions extending from shaft body 127 toward the negative side in X-axial direction, i.e., fifth portion 125 and sixth portion 126. Projection part 141 is interposed between fifth portion 125 and sixth portion 126.

Next, a concrete operation of first transmission mechanism 100a will be described with reference to FIGS. 9A to 9C, FIGS. 10A to 10C, and FIGS. 11A to 11C.

Figure 9A:
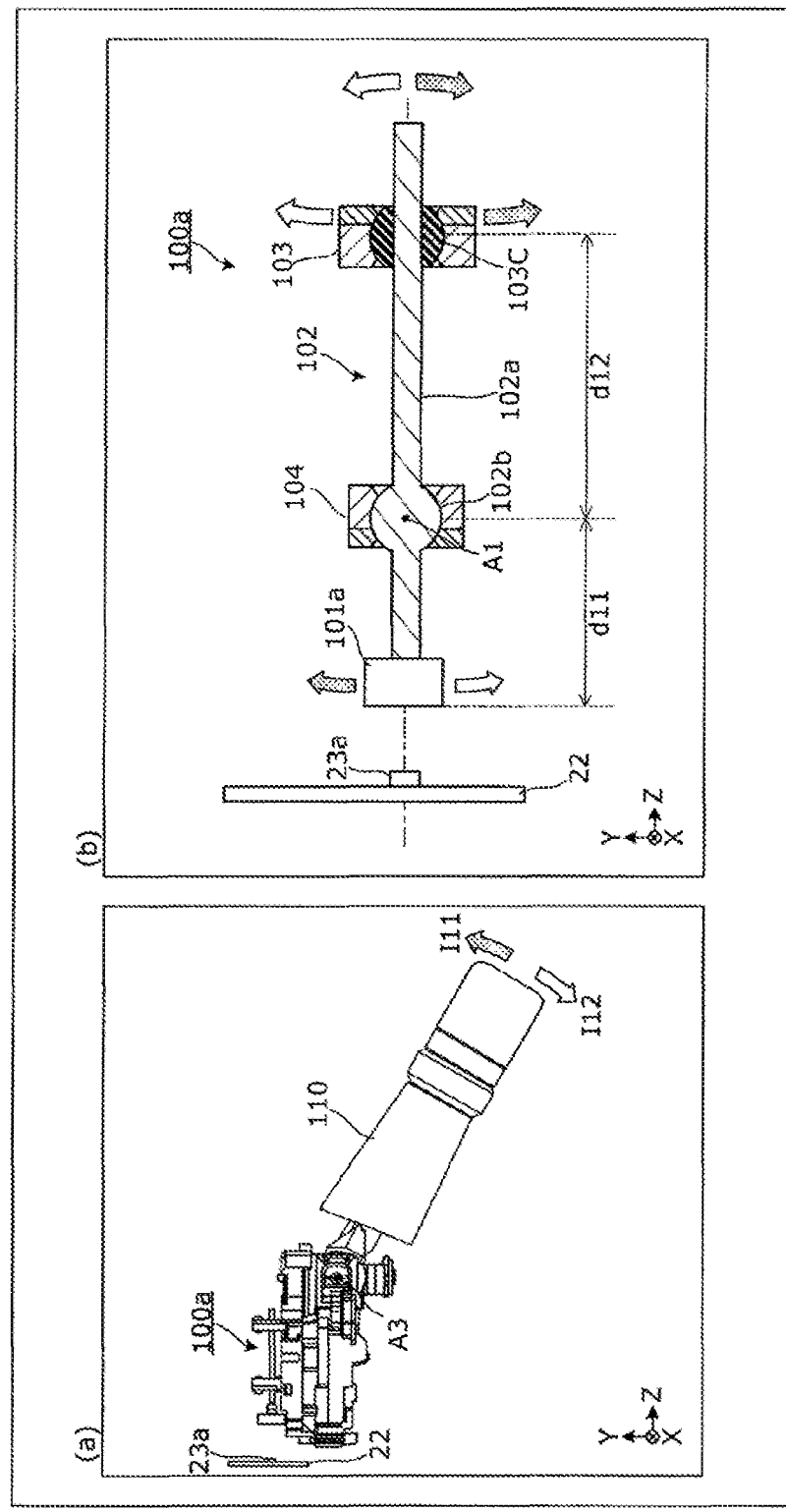
FIG. 9A is a view for explaining a relationship between a lever operation in which a third axis is employed as a fulcrum and a movement of the transmission mechanism.
Figure 9B:
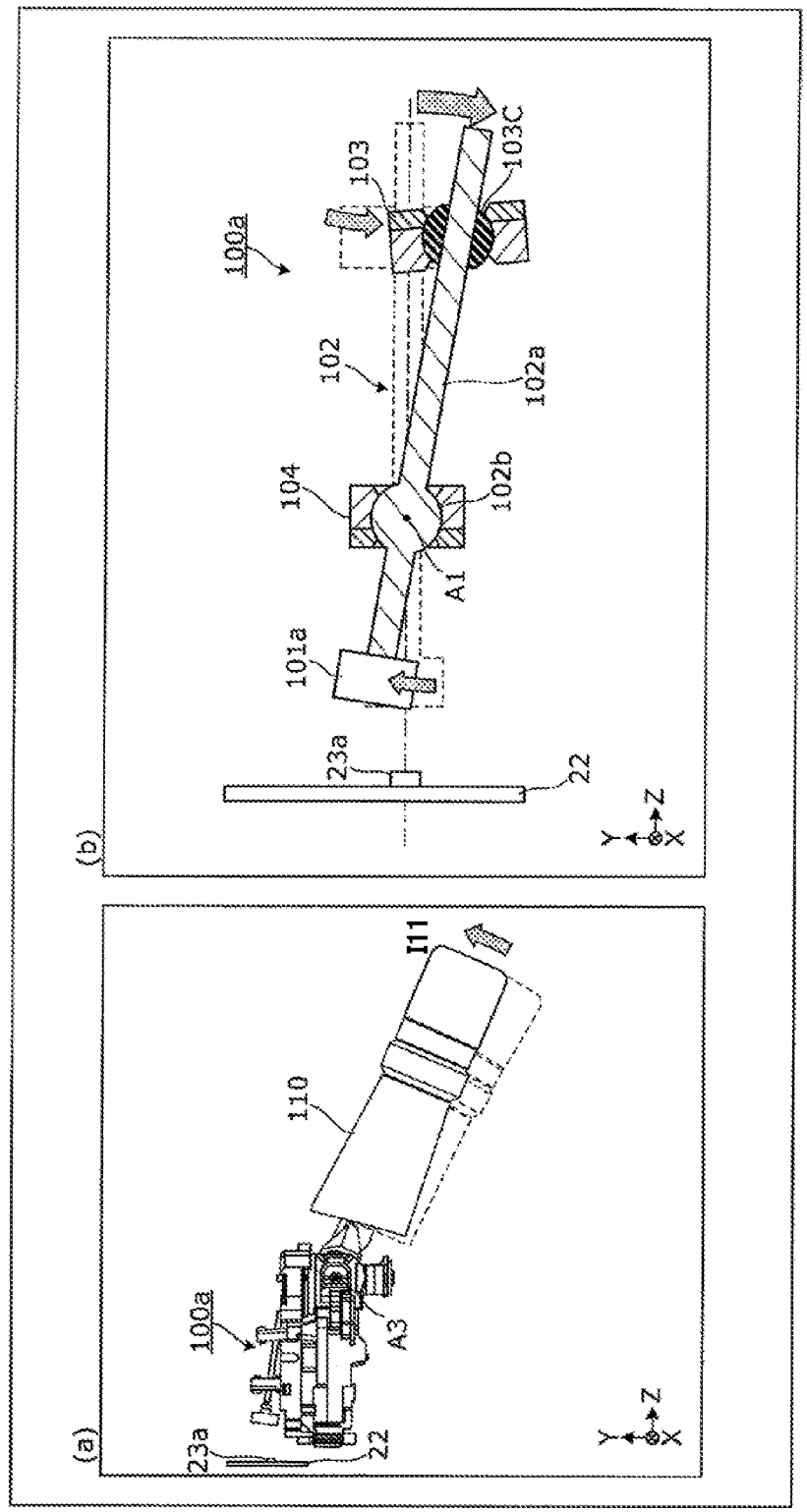
FIG. 9B is a view for explaining the relationship between the lever operation in which the third axis is employed as a fulcrum and the movement of the transmission mechanism.
Figure 9C:
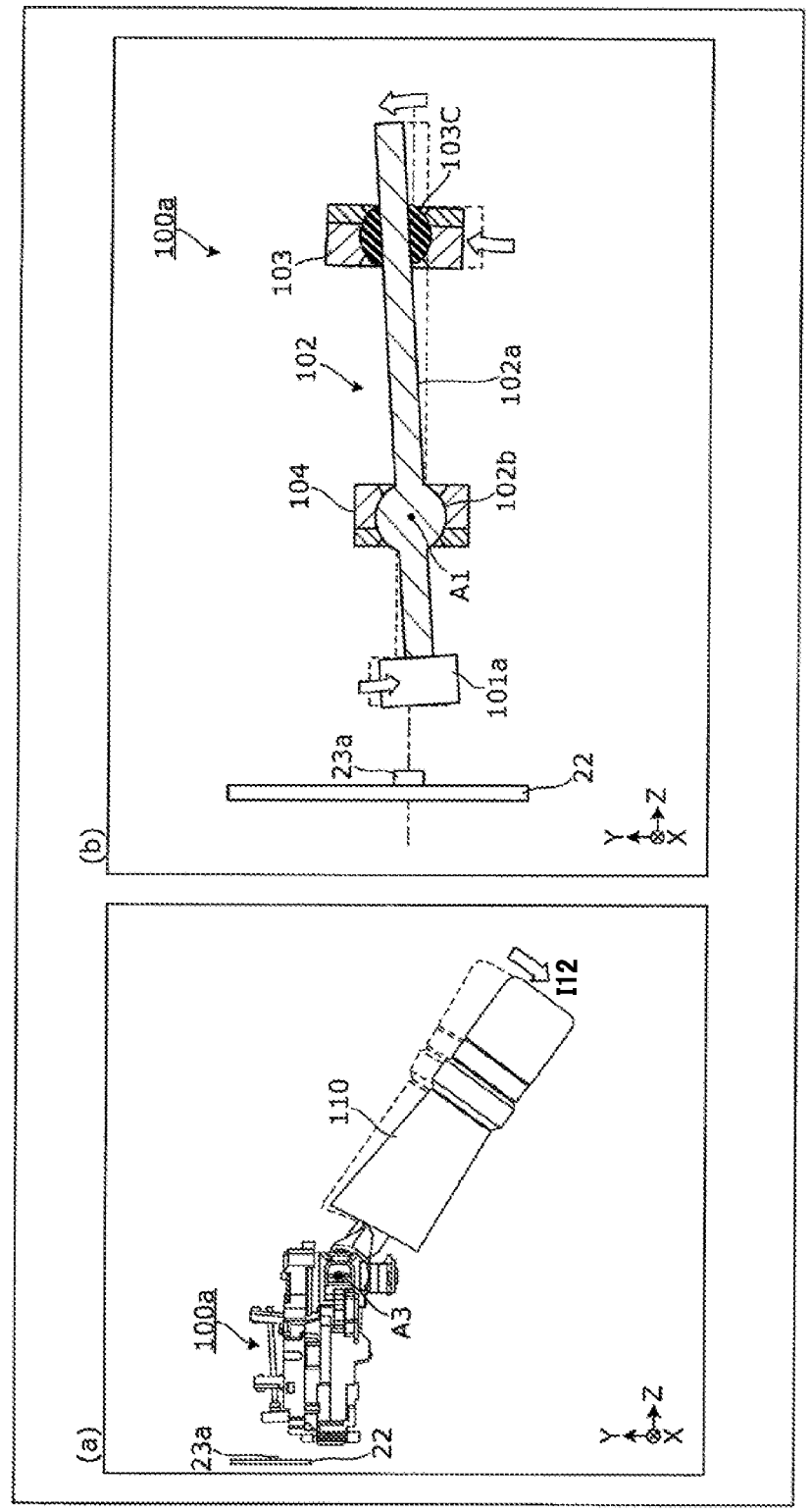
FIG. 9C is a view for explaining the relationship between the lever operation in which the third axis is employed as a fulcrum and the movement of the transmission mechanism.

FIGS. 9A to 9C are views for explaining a relationship between a lever operation, in which the third axis is employed as a fulcrum, and movement of the transmission mechanism.

Herein, (a) of FIG. 9A is a view showing the state where lever 110 is rocked about third axis A3 as a fulcrum, when a driver applies, to lever 110, input I11 or input I12 about third axis A3 parallel to X-axial direction as a fulcrum. Further, (b) of FIG. 9A is a view for explaining movement of first transmission mechanism 100a when first supporting body 103 receives a first input due to the rocking (third rocking) of lever 110 shown in (a) of FIG. 9A. Furthermore, (b) of FIG. 9A is a cross-sectional view of circuit board 22 and transmission mechanism 100a taken along Y-Z plane. Still further, FIG. 9B shows an example when input I11 is applied to the lever 110, and (a) and (b) of FIG. 9B are views corresponding to (a) and (b) of FIG. 9A, respectively. Still furthermore, FIG. 9C shows an example when input I12 is applied to lever 110, and (a) and (b) of FIG. 9C are views corresponding to (a) and (b) of FIG. 9A, respectively.

When a driver applies input I11 or I12 and rocks lever 110 about third axis A3 as a fulcrum as shown in (a) of FIG. 9A, first transmission mechanism 100a is rocked about first axis A1 parallel to X-axial direction as a fulcrum (first rocking) as shown in (b) of FIG. 9A. Herein, first axis A1 passes through center P1 of spherical part 102b of first rocking member 102, and is parallel to X-axial direction.

This structure, when first supporting body 103 receives the first input due to the third rocking of lever 110, and is moved in a direction intersecting with the first direction (Z-axial direction). Specifically, first supporting body 103 is coupled with an end on an operating point side of lever 110, and is moved toward a rotational direction about third axis A3 of lever 110 as a fulcrum.

Further, when the first supporting body 103 is moved, first rocking member 102 is rocked about second supporting body 104 as a fulcrum. Since first distance d11 between permanent magnet 101 and second supporting body 104 is shorter than second distance d12 between first supporting body 103 and second supporting body 104, when first rocking member 102 is rocked, first rocking member 102 causes first permanent magnet 101a to move by an amount of displacement smaller than an amount of the displacement inputted to first supporting body 103.

Specifically, as shown in (a) of FIG. 9B, when a driver applies input I11 toward the positive side in Y-axial direction, first supporting body 103 is turned about third axis A3 as a fulcrum toward the negative side in Y-axial direction. Accordingly, as shown in (b) of FIG. 9B, first rocking member 102 is rocked about first axis A1 of second supporting body 104 as a fulcrum in a clockwise direction of the page, and then moves first permanent magnet 101a toward the positive side in Y-axial direction.

Further, as shown in (a) of FIG. 9C, when the driver applies input I12 toward the negative side in Y-axial direction, first supporting body 103 is rotated about third axis A3 as a fulcrum toward the positive side in Y-axial direction. Accordingly, as shown in (b) of FIG. 9C, first rocking member 102 is rocked about first axis A1 of second supporting body 104 as a fulcrum in a counter clockwise direction of the page, and then moves first permanent magnet 101a toward the negative side in Y-axial direction.

Figure 10A:
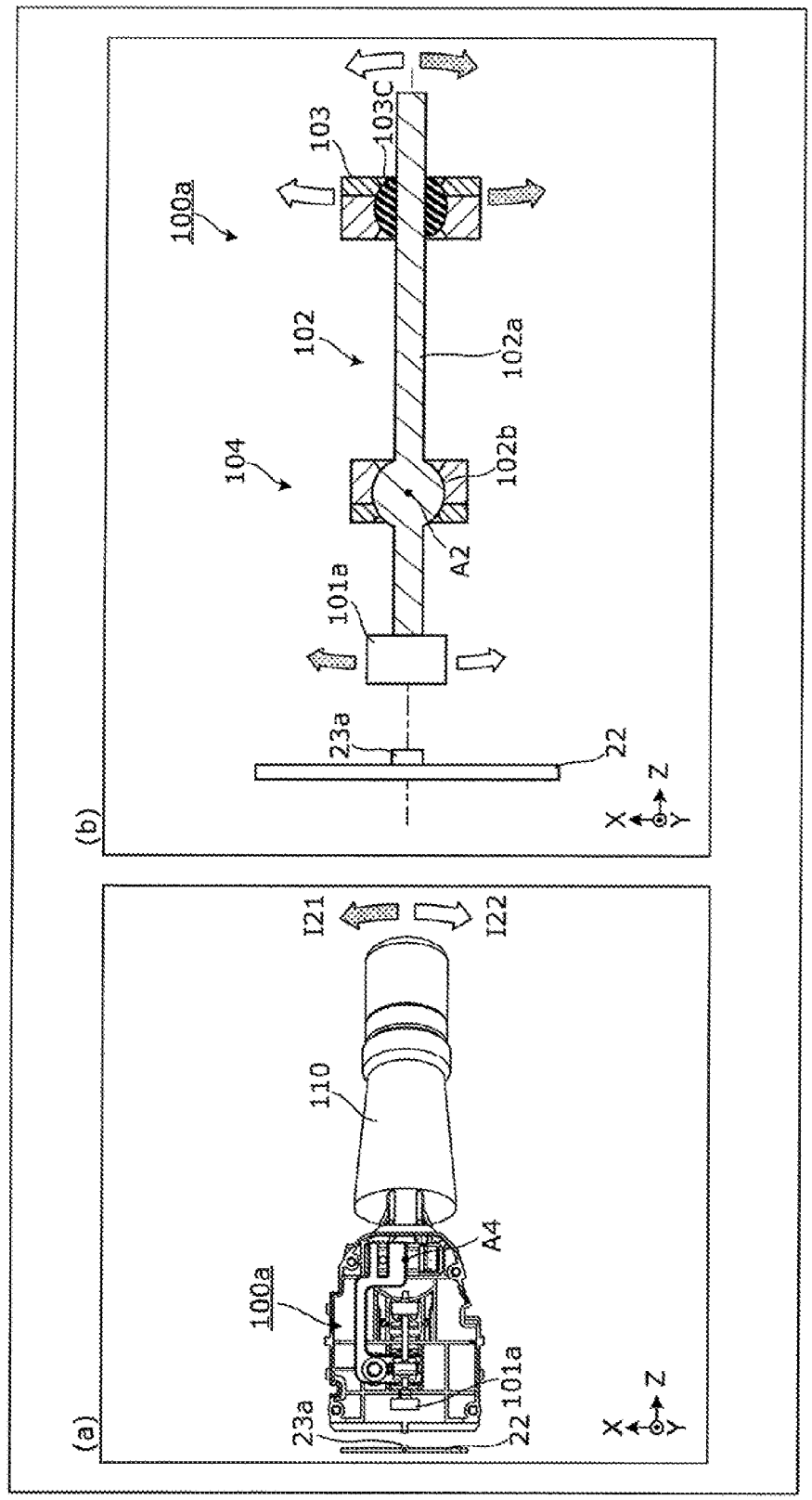
FIG. 10A is a view for explaining a relationship between a lever operation in which a fourth axis is employed as a fulcrum and a movement of the transmission mechanism.
Figure 10B:
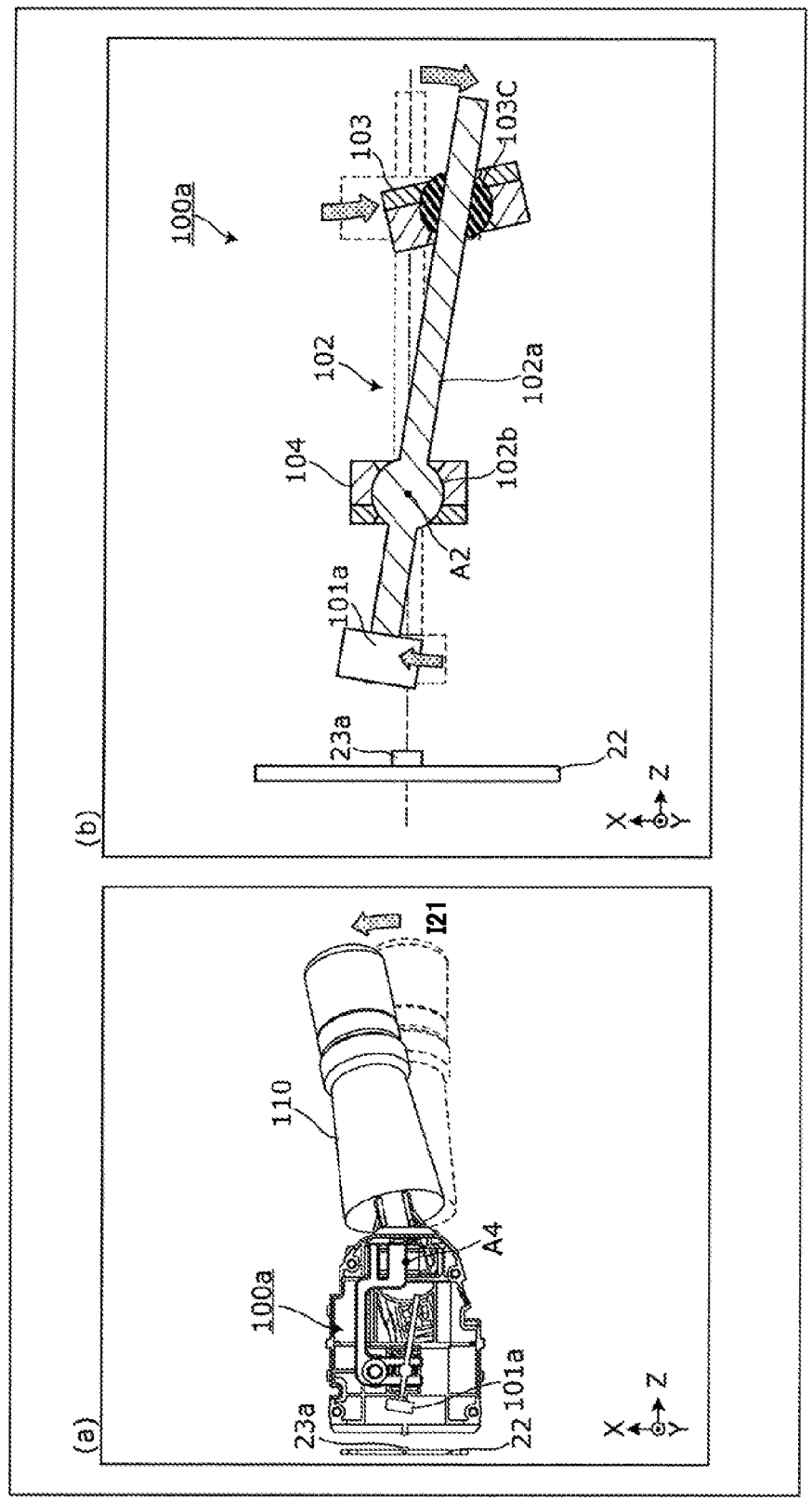
FIG. 10B is a view for explaining the relationship between the lever operation in which the fourth axis is employed as a fulcrum and the movement of the transmission mechanism.
Figure 10C:
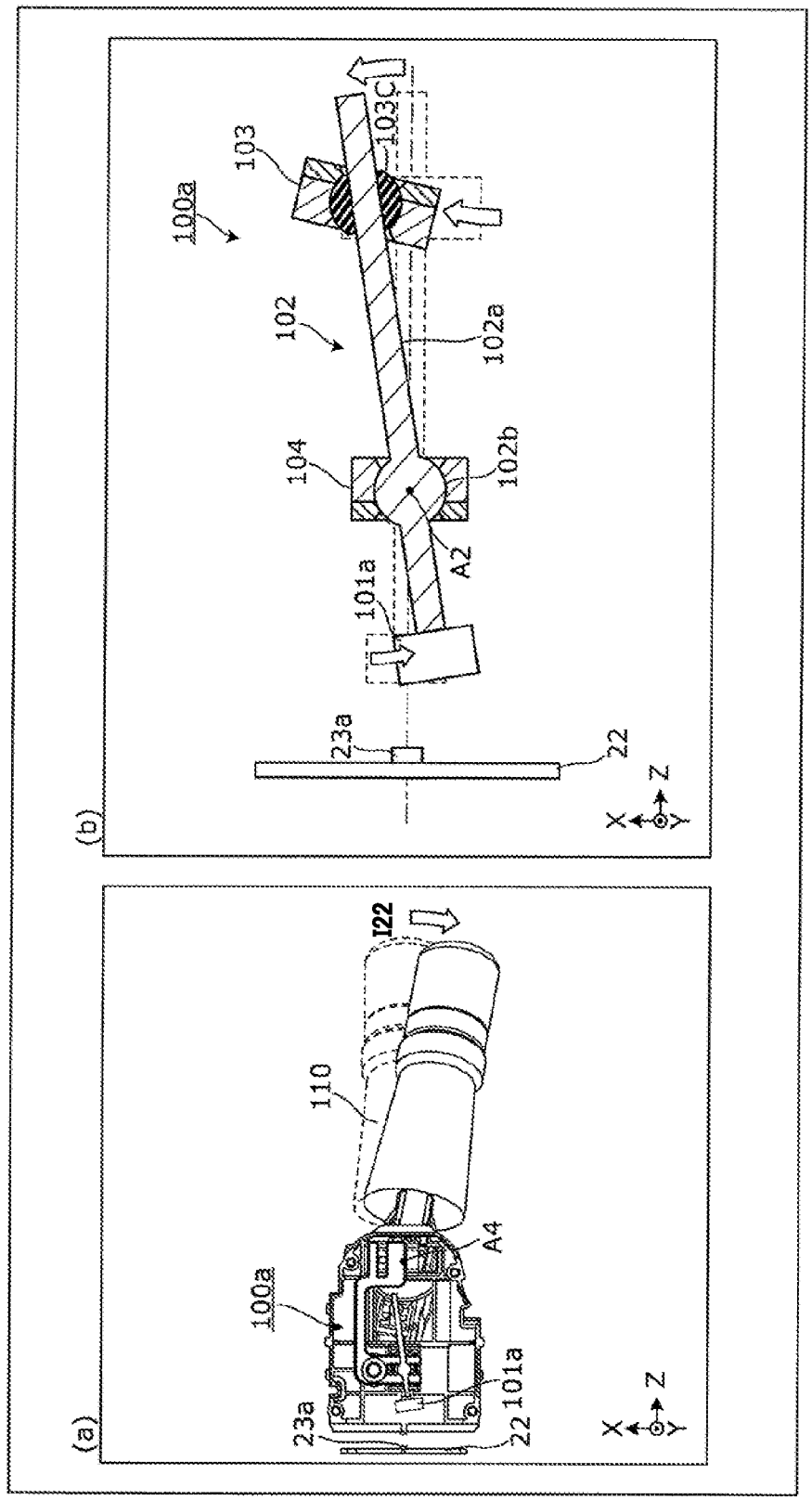
FIG. 10C is a view for explaining the relationship between the lever operation in which the fourth axis is employed as a fulcrum and the movement of the transmission mechanism.

FIGS. 10A to 10C are views for explaining a relationship between a lever operation, in which fourth axis is employed as a fulcrum, and movement of the transmission mechanism.

Herein, (a) of FIG. 10A is a view showing the state where lever 110 is rocked about fourth axis A4 as a fulcrum, when a driver applies, to lever 110, input 121 or input 122 about fourth axis A4 parallel to Y-axial direction as a fulcrum. Further, (b) of FIG. 10A is a view for explaining movement of first transmission mechanism 100a when first supporting body 103 receives a second input due to the rocking (fourth rocking) of lever 110 shown in (a) of FIG. 10A. Furthermore, (b) of FIG. 10A is a cross-sectional view of circuit board 22 and transmission mechanism 100a taken along Y-Z plane.

Still further, FIG. 10B shows an example when input 121 is applied to the lever 110, and (a) and (b) of FIG. 10B are views corresponding to (a) and (b) of FIG. 10A, respectively. Still furthermore, FIG. 10C shows an example when input 122 is applied to lever 110, and (a) and (b) of FIG. 10C are views corresponding to (a) and (b) of FIG. 10A, respectively.

When a driver applies input 121 or 122 and rocks lever 110 about fourth axis A4 as a fulcrum as shown in (a) of FIG. 10A, first transmission mechanism 100a is rocked about second axis A2 parallel to Y-axial direction as a fulcrum (second rocking) as shown in (b) of FIG. 10A. Herein, second axis A2 passes through center P1 of spherical part 102b of first rocking member 102, and is parallel to Y-axial direction.

Like As shown in FIGS. 10A to 10C, in the case where first transmission mechanism 100a is rocked about second axis A2 parallel to Y-axial direction as a fulcrum, movement of first transmission mechanism 100a is also the same as the movement described in FIGS. 9A to 9C, except that the direction of the rocking axis is different. In other words, according to the description in FIGS. 9A to 9C, first supporting body 103 receives a first input due to movement along the second direction (Y-axial direction) intersecting with Z-axial direction, and a second input due to movement along the third direction (X-axial direction) intersecting with Z-axial direction and Y-axial direction. First rocking member 102 is rocked, by the first input, about first axis A1, which is one of the two axes, as a fulcrum in second supporting body 104. Thereby first rocking member 102 moves first permanent magnet 101a along Y-axial direction different from Z-axial direction. Further, first rocking member 102 is rocked, by receiving at supporting body 103 the second input whose direction is different from the first input, about second axis A2, which is one of the two axes, as a fulcrum Thereby first rocking member 102 moves first permanent magnet 101a along a third direction (X axial direction) different from Z-axial direction and Y-axial direction.

Figure 11A:
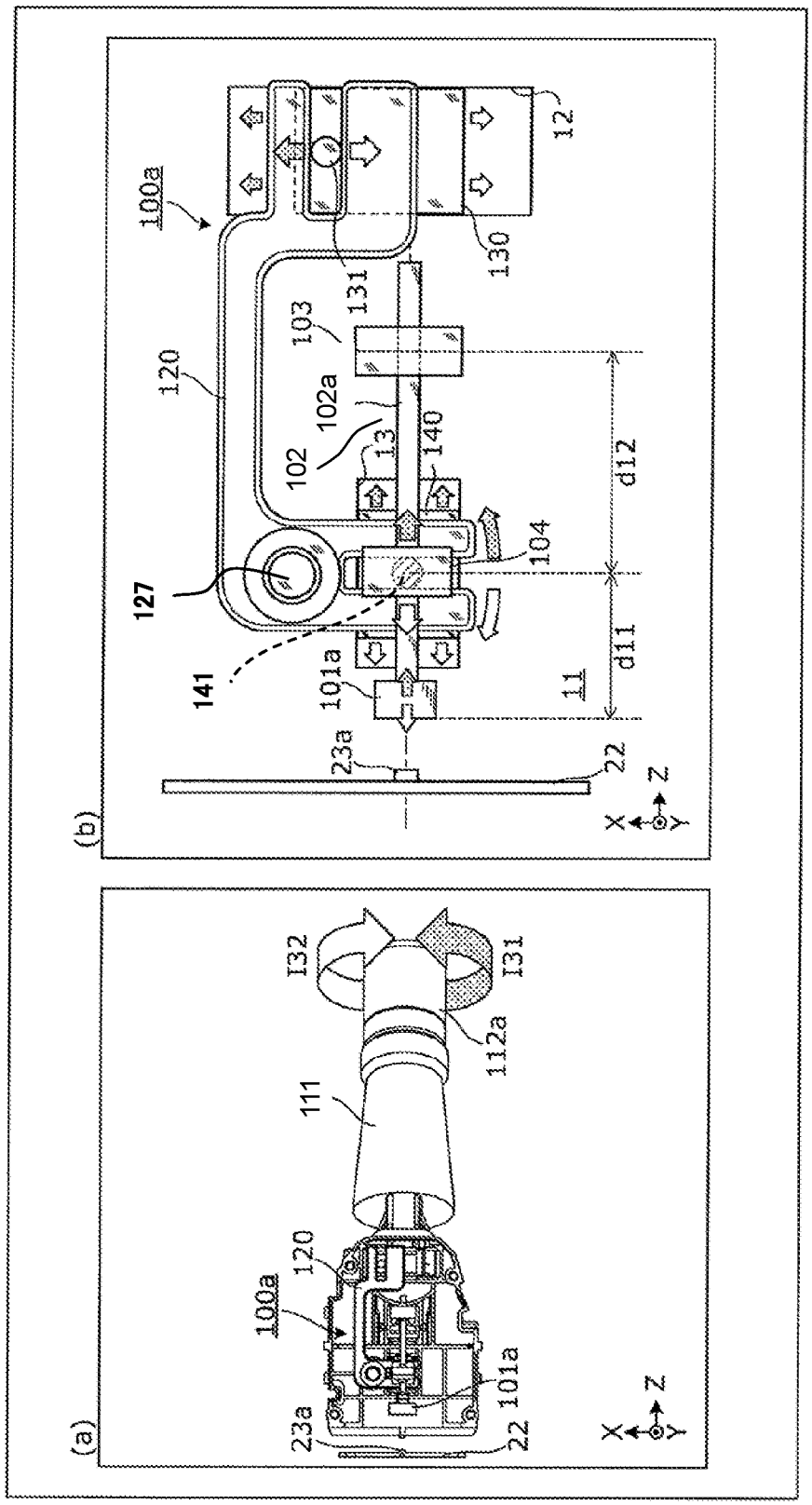
FIG. 11A is a view for explaining a relationship between a rotational operation and a movement of the transmission mechanism.
Figure 11B:
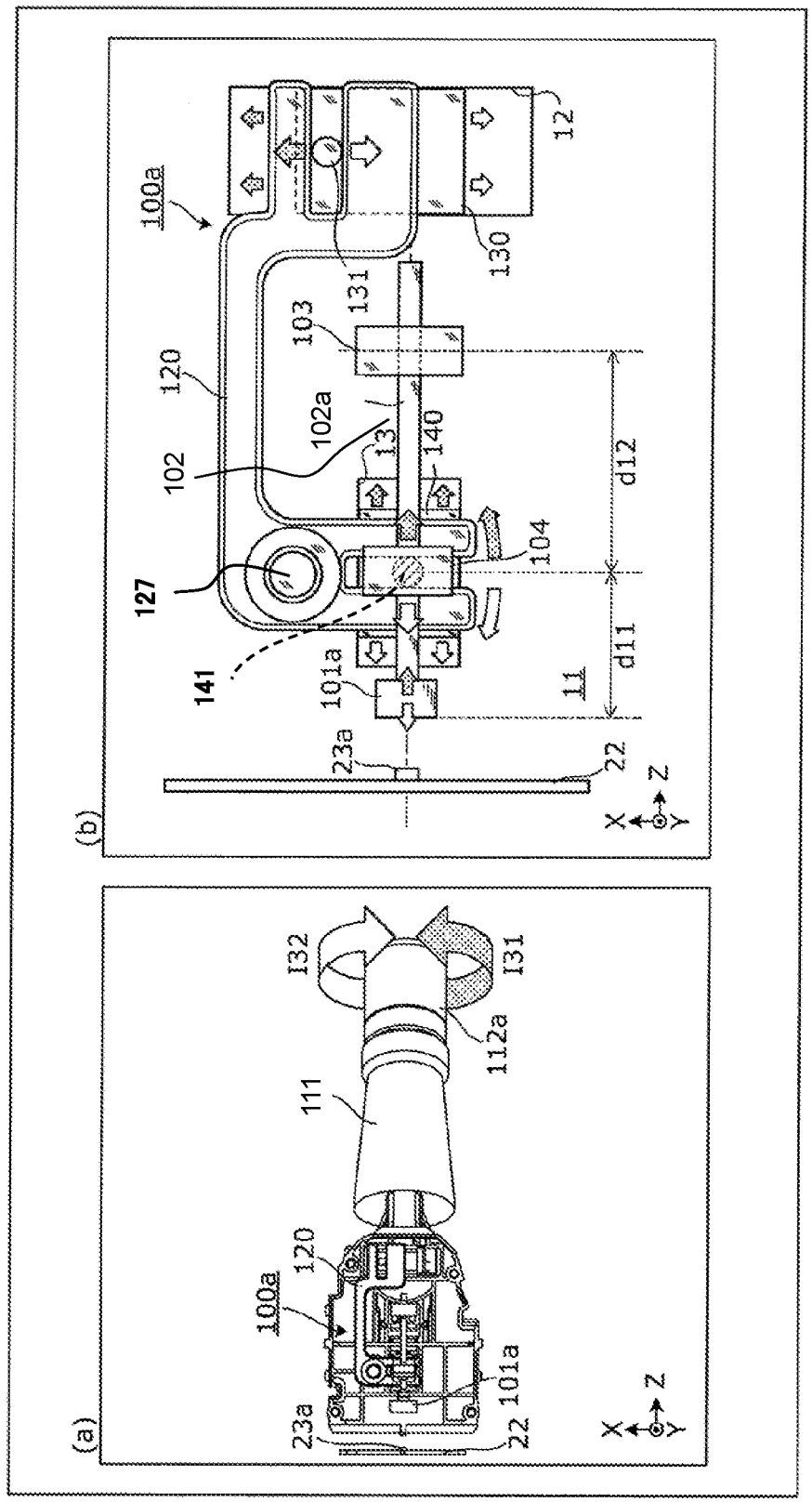
FIG. 11B is a view for explaining the relationship between the rotational operation and the movement of the transmission mechanism.
Figure 11C:
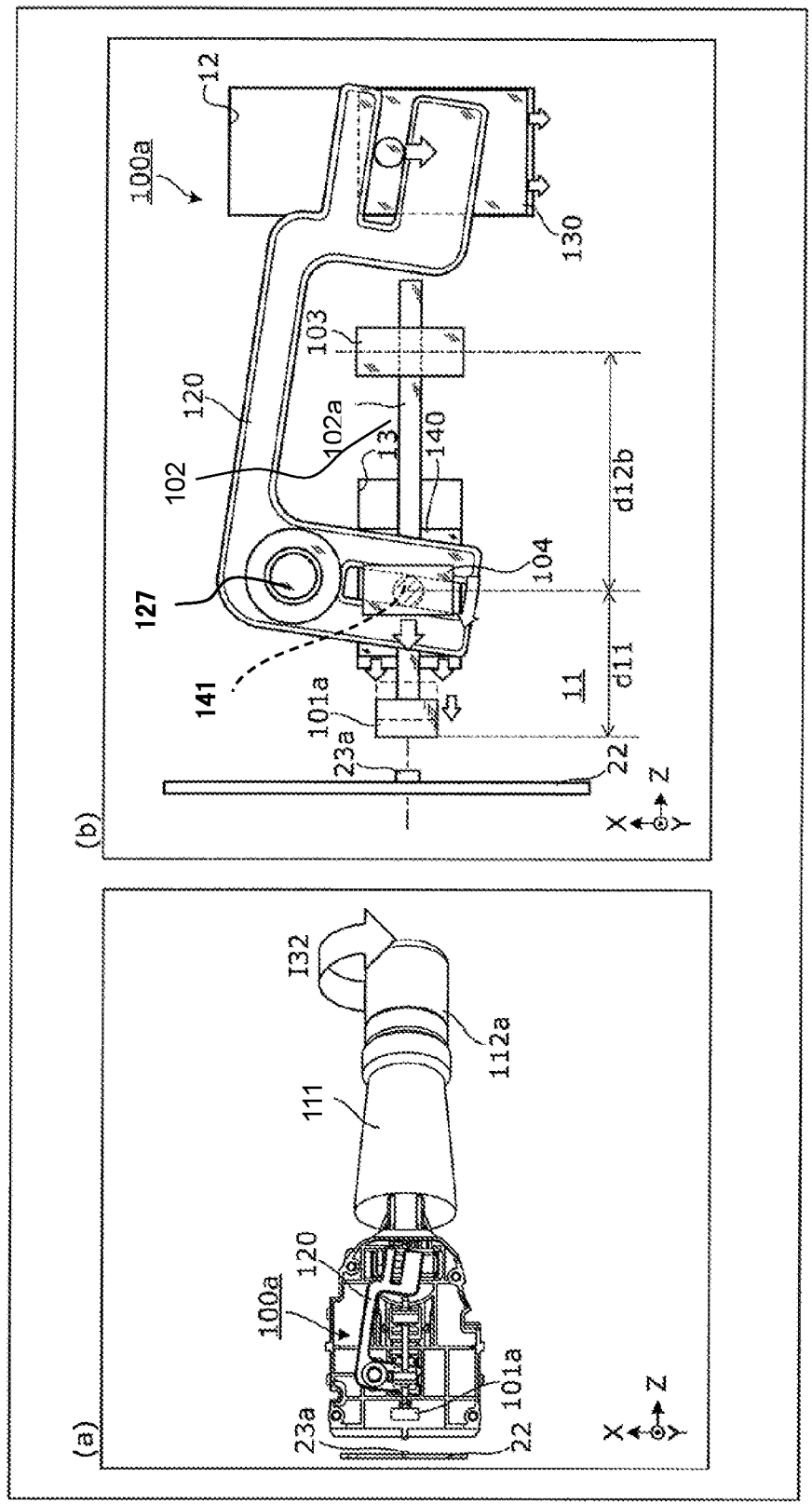
FIG. 11C is a view for explaining the relationship between the rotational operation and the movement of the transmission mechanism.

FIGS. 11A to 11C are views for explaining a relationship between a rotational operation and movement of the transmission mechanism.

Herein, (a) of FIG. 11A is a view showing the state when a driver applies, to knob 112a of lever 110 (second lever member 112), input 131 or input 132 which rotates knob 112a about lever 110 as an axis. Further, (b) of FIG. 11A is a view for explaining movement of first transmission mechanism 100a when knob 112a of lever 110 shown in (a) of FIG. 11A is rotated. Furthermore, (b) of FIG. 11A is a plan view of first transmission mechanism 100a when viewed from above (positive side in Y-axial direction). Still further, FIG. 11B shows an example when input 131 is applied to knob 112a, and (a) and (b) of FIG. 11B are views corresponding to (a) and (b) of FIG. 11A, respectively. Still furthermore, FIG. 11C shows an example when input 132 is applied to knob 112a, and (a) and (b) of FIG. 11C are views corresponding to (a) and (b) of FIG. 11A, respectively.

When input 131 or input 132 is applied to knob 112a to rotate second lever member 112 with respect to first lever member 111 as shown in (a) of FIG. 11A, first sliding member 130 is slid in X-axial direction with respect to second case 11 as shown in (b) of FIG. 11A. When sliding in X-axial direction with respect to second case 11 by rotating second lever member 112, first sliding member 130 causes second rocking member 120 to rock about shaft body 127 as an axis. When rocking about shaft body 127 as an axis, second rocking member 120 can apply a force along Z-axial direction to projection part 141 of second sliding member 140, and move second supporting body 104 along Z-axial direction.

In this way, in the case where second supporting body 104 is moved along Z-axial direction, first rocking member 102 is applied with the force in Z-axial direction to spherical part 102b because first rocking member 102 is supported such that second supporting body 104 sandwiches spherical part 102b in Z-axial direction. In other words, second supporting body 104 receives a third input due to movement along the first direction (Z-axial direction).

This structure, when first supporting body 103 supports first rocking member 102 such that rod portion 102a of first rocking member 102 is slidable in Z axial direction with respect to spherical surface member 103C, first rocking member 102 slides in Z-axial direction. In other words, first rocking member 102 is moved, by the third input, along Z-axial direction and slid with respect to first supporting body 103, thereby moving first permanent magnet 101a along Z-axial direction. Thus, first permanent magnet 101 fixed to first rocking member 102 is moved along Z-axial direction.

Specifically, when a driver applies, to knob 112a, input 131 which rotates knob 112a clockwise viewed from the positive side in Z-axial direction as shown in (a) of FIG. 11B, first sliding member 130 slides toward the positive side in X-axial direction as shown in (b) of FIG. 11B. Thus, second rocking member 120 is rocked in a counter clockwise direction of the page, and moves second supporting body 104 to the positive side in Z-axial direction. Consequently, first rocking member 102 is moved to the positive side in Z-axial direction, and first permanent magnet 101a is moved to the positive side in Z-axial direction.

Note that, in this case, second supporting body 104 is moved to the positive side in Z-axial direction but first supporting body 103 is not moved. Therefore, second distance d12a between first supporting body 103 and second supporting body 104 is shorter than second distance d12. Even in this case, second distance d12a is longer than first distance d11.

Further, when a driver applies, to knob 112a, input 132 which rotates knob 112a counter clockwise viewed from the positive side in Z-axial direction as shown in (a) of FIG. 11C, first sliding member 130 is slid toward the negative side in X-axial direction as shown in (b) of FIG. 11C. Thus, second rocking member 120 is rocked in a clockwise direction of the page, and moves second supporting body 104 to the negative side in Z-axial direction. Consequently, first rocking member 102 is moved to the negative side in Z-axial direction, and first permanent magnet 101a is moved to the negative side in Z axial direction.

Note that, in this case, second supporting body 104 is moved to the negative side in Z-axial direction but first supporting body 103 is not moved. Therefore, second distance d12b between first supporting body 103 and second supporting body 104 is still longer than second distance d12.

As mentioned above, first transmission mechanism 100a carries out three different movements, i.e., the first rocking, the second rocking, and the movement in Z-axial direction, so that first permanent magnet 101a is moved in the three different directions. Note that, these movements may be carried out at the same time. In other words, among the movement of first permanent magnet 101a due to the first rocking, the movement of first permanent magnet 101 due to the second rocking, and the movement of first permanent magnet 101a due to the movement in Z-axial direction, two or more movements may be combined. Accordingly, among the movement of first permanent magnet 101a due to the first rocking, the movement of first permanent magnet 101 due to the second rocking, and the movement of first permanent magnet 101a due to the movement in Z-axial direction, even if two or more movements are combined, the movements have respective three different directions three-dimensionally. This makes it possible to assign each of three kinds of movements to any switching operation (e.g., turning on and off blinkers to any direction, turning on and off a headlight, turning on and off a high beam of a headlight, turning on and off a windshield wiper, adjusting speed of a windshield wiper) of each device.

According to the present exemplary embodiment, first permanent magnet 101a can be moved by an amount of displacement smaller than an amount of the displacement, due to displacement by rocking, inputted to first supporting body 103. Thus, a moving distance of first permanent magnet 101a can be reduced while first permanent magnet 101a has been brought close to first magnetic sensor 23a, even if a position of the rocking axis of lever 110 is set within a predetermined range, for example. As a result, the moving distance of the object to be moved can appropriately be adjusted into the first detection area S1 of first magnetic sensor 23a for detecting first permanent magnet 101a. Accordingly, first permanent magnet 101a can be detected with sufficient accuracy without, for example, employing a detecting unit with a huge detection area, or employing a plurality of magnetic sensors. Therefore, the manufacturing cost can be reduced.

Further, first permanent magnet 101a can be moved by an amount of displacement smaller than an amount of the inputted displacement with a simple structure.

Further, even if an input due to movement in different directions is applied, first permanent magnet 101a can be moved in the respective different directions, thereby being available for, for example, a detecting unit to switch operations of different devices.

Furthermore, first permanent magnet 101a can easily be moved in three different directions, thereby being available for, for example, a detecting unit to switch operations of three different devices by using one first transmission mechanism 100a. This makes it possible to simplify the structure.

Further, first permanent magnet 101a can be moved along an arc. This makes it relatively easy to calculate the coordinate value when first permanent magnet 101a is detected by first magnetic sensor 23a. Further, the movement of first permanent magnet 101a is achieved by moving the two members, i.e., first supporting body 103 and second supporting body 104. This makes it possible to relatively reduce stacked tolerance, which affects the moving distance of first permanent magnet 101a.

Furthermore, the connection of first case 21 and second case 11 makes it suitable to move permanent magnet 101 into first detection area S1 in which first magnetic sensor 23a can detect. This eliminates necessity for wiring between first case 21 and second case 11, thereby making it possible to reduce the manufacturing cost.

First Modification

Next, a first modification in accordance with the above-mentioned exemplary embodiment will be described with reference to FIG. 12.

Figure 12:
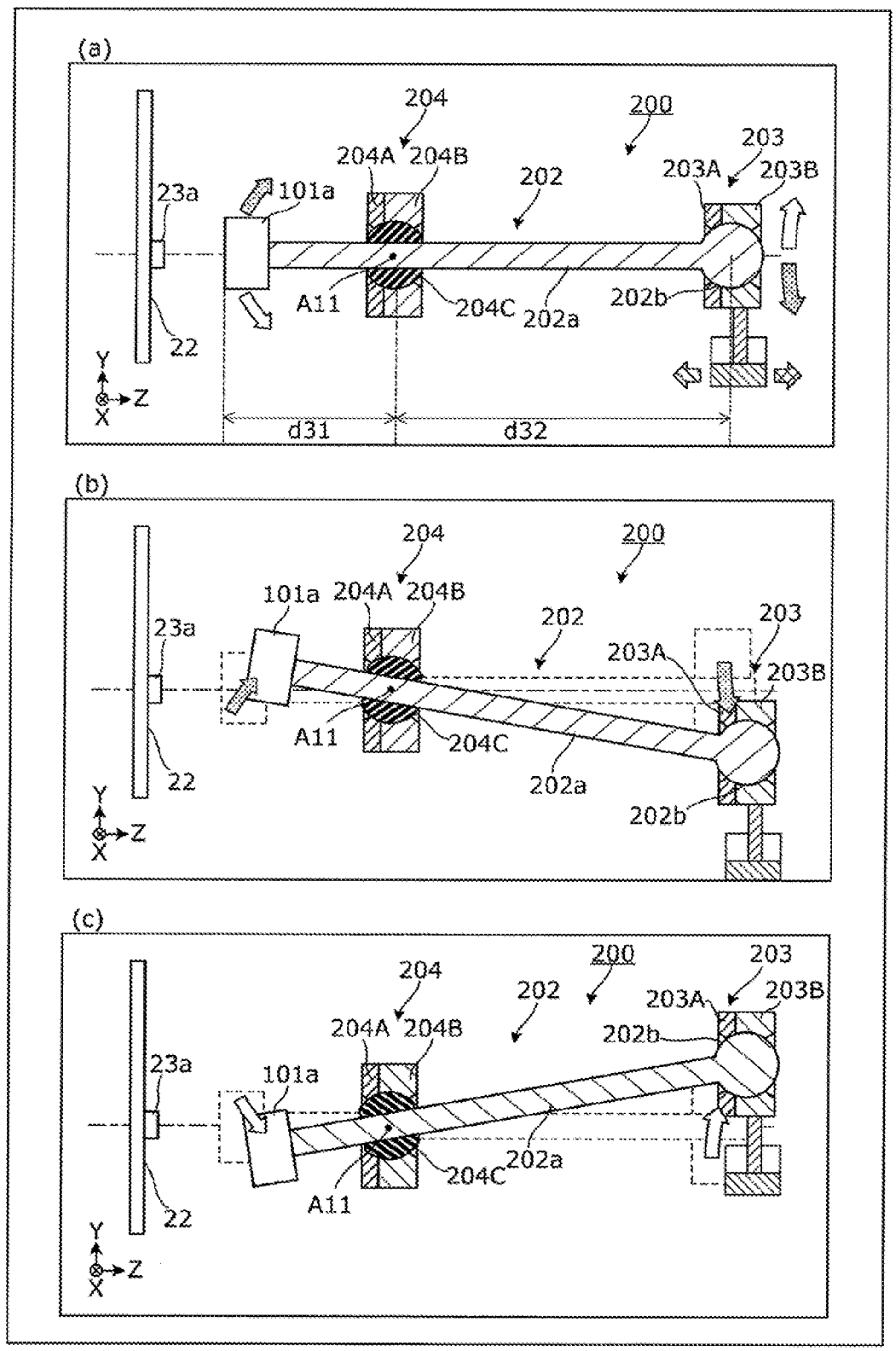
FIG. 12 is a view for explaining a transmission mechanism in accordance with a first modification of the exemplary embodiment.

FIG. 12 is a view for explaining a transmission mechanism in accordance with the first modification of the exemplary embodiment. Note that, in FIG. 12, first supporting body 203 is coupled with an end on the operating point side of lever 110, as shown in FIG. 7.

In first transmission mechanism 100a of the exemplary embodiment, first rocking member 102 has spherical part 102b having a spherical shape whose diameter is larger than a width of rod portion 102a at a portion at which first rocking member 102 is supported by second supporting body 104, but is not limited to this. For instance, like first rocking member 202 of transmission mechanism 200 shown in FIG. 12, spherical part 202b having a spherical shape whose diameter is larger than a width of rod portion 202a may be provided at a portion at which rod portion 202a is supported by first supporting body 203. In this case, spherical part 202b is formed at an end on the positive side in Z-axial direction of rod portion 202a.

Further, first supporting body 203 spherically supports spherical part 202b of first rocking member 202, and has the same structure as second supporting body 104 of the exemplary embodiment. In other words, first supporting body 203 has pressing member 203A and main support member 203B. Pressing member 203A and main support member 203B, mentioned above, have the same structures as the pressing member 104A and main support member 104B of the second supporting body 104 in the exemplary embodiment, respectively. Therefore, description about a detailed structure of first supporting body 203 is omitted.

Further, second supporting body 204 has the same structure as first supporting body 103 of the exemplary embodiment. In other words, second supporting body 204 has pressing member 204A, main support member 204B, and spherical surface member 204C. Pressing member 204A, main support member 204B, and spherical surface member 204C, which are mentioned above, have the same structures as pressing member 103A, main support member 103B, and spherical surface member 103C of first supporting body 103 in the exemplary embodiment, respectively. Thus, description about a detailed structure of second supporting body 204 is omitted. Note that, second supporting body 204 has the same structure as first supporting body 103 of the exemplary embodiment. Accordingly, second supporting body 204 and first rocking member 202 are connected to be slidable and rockable in a direction in which rod portion 202a is extended.

This structure, when first supporting body 203 receives the input applied by the rocking of lever 110, first supporting body 203 is moved in a direction intersecting with the first direction (Z-axial direction). Specifically, first supporting body 203 is coupled with an end on the operating point side of lever 110, and is moved toward a direction in which lever 110 is turned about third axis A3 or fourth axis A4 as a fulcrum.

Further, second supporting body 204 serves as a rocking fulcrum of first rocking member 202 when first supporting body 203 is moved. Herein, first distance d31 between first permanent magnet 101a and second supporting body 204 is shorter than second distance d32 between first supporting body 203 and second supporting body 204. Accordingly, first rocking member 202 is rocked to cause first permanent magnet 101a to move by an amount of displacement smaller than an amount of the displacement inputted to first supporting body 203, like the exemplary embodiment. Note that, although distance d31 and second distance d32 are varied by rocking, even if varied, distance d31 and second distance d32 are configured to satisfy the relationship that first distance d31 is shorter than second distance d32.

Specifically, as shown in (b) of FIG. 12, when first supporting body 203 is turned about third axis A3 as a fulcrum toward the negative side in Y-axial direction, first rocking member 202 slides toward the positive side in Z-axial direction while rocking about first axis A11 of second supporting body 204 as a fulcrum in a clockwise direction of the page, and moves first permanent magnet 101a along the positive side in Y-axial direction.

Further, as shown in (c) of FIG. 12, when first supporting body 203 is turned about third axis A3 as a fulcrum toward the positive side in Y-axial direction, first rocking member 202 slides toward the positive side in Z-axial direction while rocking about first axis A11 of second supporting body 204 as a fulcrum in a counter clockwise direction of the page, and moves first permanent magnet 101a along the negative side in Y-axial direction.

Furthermore, although not illustrated, if first supporting body 203 is moved to Z-axial direction, a mechanism for moving first supporting body 203 to Z-axial direction will be needed to achieve the above requirement.

In this way, by constructing transmission mechanism 200, first permanent magnet 101a can be moved from one part of first supporting body 203 toward three different directions, thereby making it possible to reduce stacked tolerance which affects a moving distance of first permanent magnet 101a.

Second Modification

Next, a second modification of the exemplary embodiment, mentioned above, will be described with reference to FIG. 13.

Figure 13:
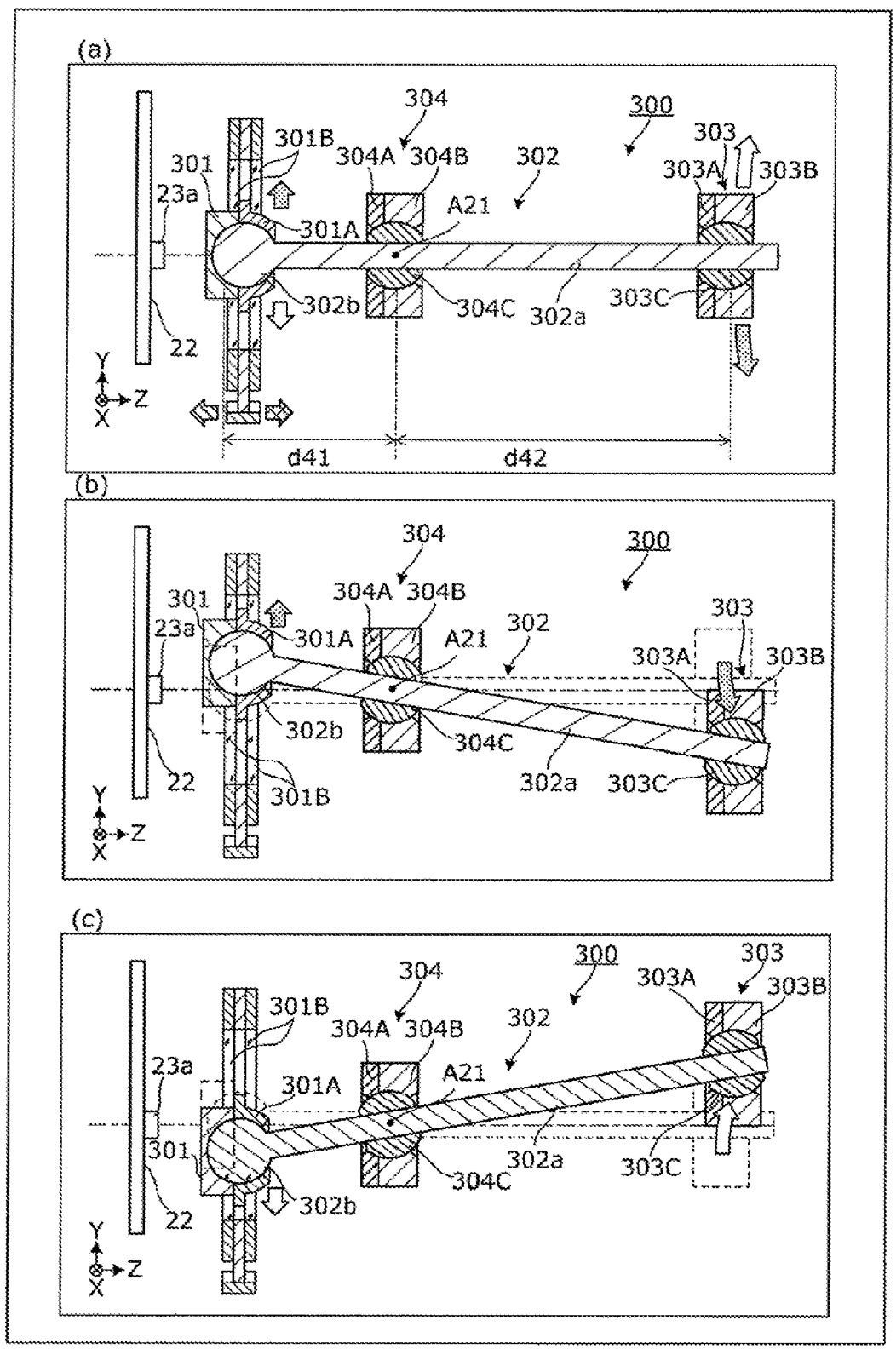
FIG. 13 is a view for explaining a transmission mechanism in accordance with a second modification of the exemplary embodiment.

FIG. 13 is a view for explaining a transmission mechanism in accordance with the second modification of the exemplary embodiment. Note that, in FIG. 13, first supporting body 303 is coupled with an end on the operating point side of lever 110, like in FIG. 7.

In first transmission mechanism 100a of the exemplary embodiment, spherical part 102b having a spherical shape whose diameter is larger than a width of rod portion 102a is provided at a portion at which first rocking member 102 is supported by second supporting body 104, but not limited to this. For instance, like first rocking member 302 of transmission mechanism 300 shown in FIG. 13, spherical part 302b having a spherical shape whose diameter is larger than a width of rod portion 302a may be provided at an end on the negative side in Z-axis direction of first rocking member 302.

Hereinafter, a concrete structure of transmission mechanism 300 will be described.

Unlike first transmission mechanism 100a of the exemplary embodiment, transmission mechanism 300 further has third supporting body 301A and guide member 301B. Third supporting body 301A spherically supports an end of first rocking member 302, and supports first permanent magnet 301 at a position corresponding to the end of first rocking member 302. Note that, in the embodiment of FIG. 13, third supporting body 301A spherically supports spherical part 302b together with first permanent magnet 301.

Guide member 301B moves third supporting body 301A along a plane intersecting with the first direction (Z-axial direction).

Further, although not illustrated, if third supporting body 301A is moved to Z-axial direction, a mechanism for moving third supporting body 301A to Z-axial direction will be needed to achieve the above requirement.

Furthermore, first supporting body 303 and second supporting body 304, which are included in transmission mechanism 300, have the same structure as first supporting body 103 of the exemplary embodiment. In other words, first supporting body 303 and second supporting body 304 have pressing members 303A and 304A, main support members 303B and 304B, and spherical surface members 303C and 304C, respectively. Pressing members 303A and 304A, main support members 303B and 304B, and spherical surface members 303C and 304C have the same structures as pressing member 103A, main support member 103B, and spherical surface member 103C of first supporting body 103 in the exemplary embodiment, respectively. Accordingly, description about detailed structures of first supporting body 303 and second supporting body 304 is omitted.

This structure, when first supporting body 303 receives an input applied by the rocking of lever 110, and is moved in a direction intersecting with the first direction (Z-axial direction). Specifically, first supporting body 303 is coupled with an end on the operating point side of lever 110, and is moved toward a direction in which lever 110 rotates about third axis A3 or fourth axis A4 as a fulcrum. First supporting body 303 is slidably connected to rod portion 302a of first rocking member 302. Accordingly, even if first supporting body 303 is turned as mentioned above, an end on the positive side in Z-axial direction of first rocking member 302 is moved along Y-axial direction while an angle of first rocking member 302 is changed about spherical part 302b as a fulcrum.

Further, second supporting body 304 serves as a rocking fulcrum of first rocking member 302 when first supporting body 303 is moved. Furthermore, second supporting body 304 is fixed to second case 11 and slidably connected to rod portion 302a of first rocking member 302. Accordingly, when first supporting body 303 is moved along Y-axial direction, spherical part 302b is moved along guide member 301B in a direction (i.e., X-axial direction, or Y-axial direction) orthogonal to Z-axial direction.

Note that, since first distance d41 between first permanent magnet 301 and second supporting body 304 is shorter than second distance d42 between first supporting body 303 and second supporting body 304, first rocking member 302 is rocked to move first permanent magnet 301 by an amount of displacement smaller than an amount of the displacement inputted to first supporting body 303, like the exemplary embodiment. Note that, although distance d42 is varied by rocking, even if varied, distance d42 is configured to satisfy the relationship that first distance d41 is shorter than second distance d42.

Specifically, as shown in (b) of FIG. 13, when first supporting body 303 rotates about third axis A3 as a fulcrum toward the negative side in Y-axial direction, first rocking member 302 is rocked about first axis A21 of second supporting body 304 as a fulcrum in a clockwise direction of the page. This structure, when spherical part 302b, i.e., the end on the negative side in Z-axial direction of first rocking member 302 is supported by third supporting body 301A and guided by guide member 301B such that spherical part 302b is moved in a direction orthogonal to Z-axial direction. Thus, first permanent magnet 301 is moved to the positive side in Y-axial direction.

Further, as shown in (c) of FIG. 13, when first supporting body 303 rotates about third axis A3 as a fulcrum toward the positive side in Y-axial direction, first rocking member 302 is rocked about first axis A21 of second supporting body 304 as a fulcrum in a counter clockwise direction of the page. This structure, when spherical part 302b, i.e., the end on the negative side in Z-axial direction of first rocking member 302 is supported by the third supporting body 301A and guided by guide member 301B such that spherical part 302b is moved in a direction orthogonal to Z-axial direction. Thus, first permanent magnet 301 is moved to the negative side in Y-axial direction.

Further, although not illustrated, if first permanent magnet 301 is moved to Z-axial direction, guide member 302B will be needed to move in Z-axial direction to achieve the above requirement.

In this way, by constructing transmission mechanism 300, first permanent magnet 301 can be moved on a plane perpendicular to Z-axial direction. This makes it easy to calculate the coordinate value when first permanent magnet 301 is detected by first magnetic sensor 23a.

Other Exemplary Embodiment

According to the above-mentioned exemplary embodiments, the transmission mechanism moves the permanent magnet, which serves as an object to be moved, along three different directions, i.e., X-axial direction, Y-axial direction, and Z-axial direction, but not limited to this. The permanent magnet may be moved in at least one direction. In this case, rocking in only one axial direction, which is one of two axial directions, or movement along Z-axial direction may be employed.

Further, according to the above-mentioned exemplary embodiments, the mechanism for rocking second rocking member 120 by rotating knob 112a of lever 110 is employed, but not limited to this. A mechanism for rocking second rocking member 120 by using the third rocking or the fourth rocking of lever 110 may be employed. Furthermore, a mechanism for causing first rocking member 102 to perform the first rocking or the second rocking by turning knob 112a of lever 110 may be employed.

Still further, the above-mentioned exemplary embodiment has such a configuration that second permanent magnet 101b is moved by rocking second transmission mechanism 100b, but this configuration may be eliminated.

As mentioned above, the transmission mechanism, the lever mechanism, and the contactless lever switch in accordance with one or more aspects of the present invention have been described based on the exemplary embodiments, but the present invention is not limited to the exemplary embodiments. Various modifications to this embodiment which may be conceived by those skilled in the art, as well as embodiments resulting from combinations of some of the structural elements of this embodiment are to be included within one or more aspects of the present invention, as long as such modifications and embodiments do not depart from the essence of the present invention.

INDUSTRIAL APPLICABILITY

The present invention is useful as a transmission mechanism, a lever mechanism, a contactless lever switch, and the like capable of reducing the manufacturing cost.

REFERENCE MARKS IN THE DRAWINGS 1 contactless lever switch
10 and 30 lever mechanism
11 second case
12 and 13 opening
20 control device
21 first case
22 circuit board
23 magnetic sensor
23a first magnetic sensor
23b second magnetic sensor
24 controller
100, 200, and 300 transmission mechanism
100a first transmission mechanism
100b second transmission mechanism
101 permanent magnet
101a first permanent magnet
101b second permanent magnet
102, 202, and 302 first rocking member
102a and 202a rod-like portion
102b and 202b spherical surface
103, 203, and 303 first supporting body
103A, 203A, and 303A pressing member
103Aa, 103Ba, 104Aa, and 104Ba through hole
103Ab, 103Bb, 104Ab, and 104Bb spherical surface
103B, 203B, and 303B main support member
103C, 303C, and 304C spherical surface member
104, 204, and 304 second supporting body
104A, 204A, and 304A pressing member
104B, 204B, and 304B main support member
110 lever
111 first lever member
112 second lever member
112a knob
112b protrusion
113 third lever member
113a knob
113b protrusion
120 second rocking member
121 first portion
122 second portion
123 third portion
124 fourth portion
125 fifth portion
126 sixth portion
127 shaft body
130 first sliding member
131 projection part
140 second sliding member
141 projection part
204C spherical surface member
301 first permanent magnet
301A third supporting body
301B and 302B guide member
302a rod-like portion
302b spherical surface

The invention claimed is:

1. A transmission mechanism for moving an object to be moved, the transmission mechanism comprising:
a first rocking member with a rod shape that includes one end at which the object to be moved is disposed, the first rocking member extending in a first direction;
a first supporting body and a second supporting body that rockably support the first rocking member at two different positions in the first direction of the first rocking member;
a third supporting body that spherically supports the one end of the first rocking member and supports the object to be moved at a position corresponding to the one end of the first rocking member; and
a guide that performs at least one of movement for moving the third supporting body along a plane intersecting with the first direction or movement for moving the first rocking member in the first direction by receiving the third input due to the movement along the first direction and moving in the first direction, wherein:

the first supporting body receives an input due to displacement and moves in a direction intersecting with the first direction, the second supporting body is disposed closer to the one end than the first supporting body is in the first supporting body and the second supporting body, and serves as a rocking fulcrum of the first rocking member when the first supporting body moves, the second supporting body rockably supports the first rocking member by at least two axes constituted by a first axis and a second axis whose directions are different from each other; a first distance between the one end of the first rocking member and the second supporting body is shorter than a second distance between the first supporting body and the second supporting body, the first rocking member is rocked to move the object to be moved by an amount of displacement smaller than an amount of displacement inputted to the first supporting body which is located on a side of the other end of the first rocking member in the first supporting body and the second supporting body, the first supporting body receives a first input due to movement along a second direction intersecting with the first direction, and receives a second input due to movement along a third direction intersecting with the first direction and the second direction, in the second supporting body, the first rocking member is rocked, by the first input, about the first axis, which is one of; the first axis and the second axis, as a fulcrum to move the object to be moved along the second direction different from the first direction, in the first supporting body, the first rocking member is rocked, by receiving the second input whose direction is different from a direction of the first input, about the second axis different from the first axis as a fulcrum to move the object to be moved in the third direction different from the first direction and the second direction, one of the first supporting body and the second supporting body receives a third input due to movement along the first direction, the first rocking member is moved, by the third input, along the first direction and slid with respect to the other of the first supporting body and the second supporting body to move the object to be moved along the first direction, each of the first supporting body and the second supporting body and the first rocking member are connected to be slidable in the first direction, and the first rocking member is moved, by the third input, along the first direction and slid with respect to the first supporting body and the second supporting body to move the object to be moved along the first direction.

2. A transmission mechanism for moving an object to be moved, the transmission mechanism comprising:

a first rocking member with a rod shape that includes one end at which the object to be moved is disposed, the first rocking member extending in a first direction; and a first supporting body and a second supporting body that rockably support the first rocking member at two different positions in the first direction of the first rocking member, wherein:

the first supporting body receives an input due to displacement and moves in a direction intersecting with the first direction;

the second supporting body is disposed closer to the one end than the first supporting body is in the first supporting body and the second supporting body, and serves as a rocking fulcrum of the first rocking member when the first supporting body moves, the second supporting body rockably supports the first rocking member by at least two axes constituted by a first axis and a second axis whose directions are different from each other;

a first distance between the one end of the first rocking member and the second supporting body is shorter than a second distance between the first supporting body and the second supporting body, the first rocking member is rocked to move the object to be moved by an amount of displacement smaller than an amount of displacement inputted to the first supporting body which is located on a side of the other end of the first rocking member in the first supporting body and the second supporting body, the first supporting body receives a first input due to movement along a second direction intersecting with the first direction, and receives a second input due to movement along a third direction intersecting with the first direction and the second direction;

in the second supporting body, the first rocking member is rocked, by the first input, about the first axis, which is one of the first axis and the second axis, as a fulcrum to move the object to be moved along the second direction different from the first direction;

in the first supporting body, the first rocking member is rocked, by receiving the second input whose direction is different from a direction of the first input, about the second axis different from the first axis as a fulcrum to move the object to be moved in the third direction different from the first direction and the second direction, one of the first supporting body and the second supporting body receives a third input due to movement along the first direction, and the first rocking member is moved, by the third input, along the first direction and slid with respect to the other of the first supporting body and the second supporting body to move the object to be moved along the first direction.

3. The transmission mechanism according to claim 2, wherein the first rocking member is spherically supported by the second supporting body, the second supporting body receives the third input and moves in the first direction to move the first rocking member along the first direction, and the first supporting body and the first rocking member are connected to be slidable and rockable in the first direction.

4. The transmission mechanism according to claim 2, wherein the first rocking member is spherically supported by the first supporting body, the first supporting body receives the third input and moves in the first direction to move the first rocking member along the first direction, and the second supporting body and the first rocking member are connected to be slidable and rockable in the first direction.

5. A lever mechanism comprising:
a first transmission mechanism serving as the transmission mechanism according to any one of claims 2 and 1-3; and
a lever that is supported to be rockable according to movement of a handle portion and gives the displacement to the first supporting body.

6. A contactless lever switch comprising:
a first case that accommodates a first magnetic sensor;
the lever mechanism according to claim 5; and
a second case that accommodates a portion at which the lever is supported and the first transmission mechanism and is connected to a predetermined position outside the first case,
wherein:
the object to be moved included in the first transmission mechanism is a first permanent magnet;
a direction and a position of the first magnetic sensor are determined such that a first detection area of the first magnetic sensor is arranged on a predetermined position side of the first case; and
in the state where the first case and the second case are connected to each other, the first transmission mechanism moves the first permanent magnet within the first detection area by using rocking from the lever.

7. The contactless lever switch according to claim 6, further comprising
a controller that specifies a three dimensional position of the first permanent magnet in the first detection area based on a detection result of the first magnetic sensor and switches operation of a device according to the specified three dimensional position.

8. A lever mechanism comprising:
a first transmission mechanism comprising:
a first rocking member with a rod shape that includes one end at which an object to be moved is disposed, the first rocking member extending in a first direction; and
a first supporting body and a second supporting body that rockably support the first rocking member at two different positions in the first direction of the first rocking member; and
a lever that is supported to be rockable according to movement of a handle portion about two axes constituted by a third axis and a fourth axis whose directions are different from each other and gives the displacement to the first supporting body,
wherein:
the first supporting body receives an input due to displacement and moves in a direction intersecting with the first direction,
the second supporting body is disposed closer to the one end than the first supporting body is in the first supporting body and the second supporting body, and serves as a rocking fulcrum of the first rocking member when the first supporting body moves,
the second supporting body rockably supports the first rocking member by at least two axes constituted by a first axis and a second axis whose directions are different from each other; a first distance between the one end of the first rocking member and the second supporting body is shorter than a second distance between the first supporting body and the second supporting body,
the first rocking member is rocked to move the object to be moved by an amount of displacement smaller than an amount of displacement inputted to the first supporting body which is located on a side of the other end of the first rocking member in the first supporting body and the second supporting body,
the first supporting body receives a first input due to movement along a second direction intersecting with the first direction, and receives a second input due to movement along a third direction intersecting with the first direction and the second direction,
in the second supporting body, the first rocking member is rocked, by the first input, about the first axis, which is one of; the first axis and the second axis, as a fulcrum to move the object to be moved along the second direction different from the first direction,
in the first supporting body, the first rocking member is rocked, by receiving the second input whose direction is different from a direction of the first input, about the second axis different from the first axis as a fulcrum to move the object to be moved in the third direction different from the first direction and the second direction, and
one of the first supporting body and the second supporting body receives a third input due to movement along the first direction,
the first rocking member is moved, by the third input, along the first direction and slid with respect to the other of the first supporting body and the second supporting body to move the object to be moved along the first direction, and
the lever is:
rocked about the third axis, which is one of in the two axes; the third axis and the fourth axis, as a fulcrum to apply the first input to the first transmission mechanism, and
rocked about the fourth axis as a fulcrum in the two axes to apply the second input to the first transmission mechanism.

9. The lever mechanism according to claim 8, wherein the lever includes:
a first lever member rockably supported; and
a second lever member whose at least one portion is disposed inside or outside the first lever member, the second lever member being provided to be rotatable with respect to the first lever member about an axis parallel to an extending direction of the lever as a rotational axis and extended in the extending direction,
wherein
the lever mechanism further comprises a second rocking member that is rocked by receiving rotation of the second lever member to apply the third input due to the movement along the first direction to the first rocking member.

10. A contactless lever switch comprising:
the lever mechanism according claim 9,
a first permanent magnet as the object to be moved included in the first transmission mechanism;
a first case that accommodates a first magnetic sensor;
a second case that accommodates a portion at which the lever is supported and the first transmission mechanism and is connected to a predetermined position outside the first case,
a second magnetic sensor different from the first magnetic sensor;
a second permanent magnet different from the first permanent magnet; and
a second transmission mechanism that includes the second permanent magnet disposed at an end on an opposite side of the second transmission mechanism from the lever and differs from the first transmission mechanism, wherein:

the object to be moved included in the first transmission mechanism is a first permanent magnet;

a direction and a position of the first magnetic sensor are determined such that a first detection area of the first magnetic sensor is arranged on a predetermined position side of the first case;

in the state where the first case and the second case are connected to each other, the first transmission mechanism moves the first permanent magnet within the first detection area by using rocking from the lever;

the lever further includes a third lever member that is disposed inside or outside the first lever member, provided to be rotatable with respect to the first lever member and the second lever member, about an axis parallel to the extending direction as a rotational axis, and extended in the extending direction;

the third lever member rotates about the axis parallel to the extending direction;

the first case further accommodates the second magnetic sensor of which a direction and a position are determined such that a second detection area of the second magnetic sensor is arranged on a predetermined position side of the first case;

the second case further accommodates the second permanent magnet and the second transmission mechanism; and in the state where the first case and the second case are connected to each other, the second transmission mechanism receives rotation of the third lever member to move the second permanent magnet within the second detection area.

11. The contactless lever switch according to claim 10, further comprising a controller that specifies a three dimensional position of the first permanent magnet in the first detection area based on a detection result of the first magnetic sensor, specifies a three dimensional position of the second permanent magnet in the second detection area based on a detection result of the second magnetic sensor, and then switches operation of a device according to the specified three dimensional position of each of the first permanent magnet and the second permanent magnet.

* * * * *